(12) United States Patent
Al-Shammari

(10) Patent No.: US 8,473,279 B2
(45) Date of Patent: Jun. 25, 2013

(54) LEMMATIZING, STEMMING, AND QUERY EXPANSION METHOD AND SYSTEM

(75) Inventor: Eiman Tamah Al-Shammari, Fairfax, VA (US)

(73) Assignee: Eiman Al-Shammari, Kuwait (KW)

( * ) Notice: Subject to any disclaimer, the term of this patent is extended or adjusted under 35 U.S.C. 154(b) by 897 days.

(21) Appl. No.: 12/476,238

(22) Filed: Jun. 1, 2009

(65) Prior Publication Data

US 2010/0082333 A1  Apr. 1, 2010

Related U.S. Application Data

(60) Provisional application No. 61/057,280, filed on May 30, 2008.

(51) Int. Cl.
G06F 17/20 (2006.01)
G06F 17/21 (2006.01)
G06F 17/27 (2006.01)
G06F 17/28 (2006.01)

(52) U.S. Cl.
USPC ..................................... 704/9; 704/8; 704/10

(58) Field of Classification Search
USPC .................. 704/1–10, E11.001–E11.007, E13.001–E13.014; 707/705–747, E17.001, 707/E17.143
See application file for complete search history.

(56) References Cited

U.S. PATENT DOCUMENTS

| | | | | |
|---|---|---|---|---|
| 5,406,480 A * | 4/1995 | Kanno | | 704/10 |
| 5,619,709 A * | 4/1997 | Caid et al. | | 715/209 |
| 5,721,938 A * | 2/1998 | Stuckey | | 704/4 |
| 5,878,385 A * | 3/1999 | Bralich et al. | | 704/9 |
| 5,937,422 A * | 8/1999 | Nelson et al. | | 715/206 |
| 5,963,940 A * | 10/1999 | Liddy et al. | | 1/1 |
| 6,035,268 A * | 3/2000 | Carus et al. | | 704/9 |
| 6,038,561 A * | 3/2000 | Snyder et al. | | 1/1 |
| 6,098,034 A * | 8/2000 | Razin et al. | | 704/9 |
| 6,163,782 A * | 12/2000 | Singhal | | 1/1 |
| 6,275,789 B1 * | 8/2001 | Moser et al. | | 704/7 |
| 6,366,908 B1 * | 4/2002 | Chong et al. | | 1/1 |
| 6,415,250 B1 * | 7/2002 | van den Akker | | 704/9 |
| 6,470,307 B1 * | 10/2002 | Turney | | 704/9 |
| 6,901,399 B1 * | 5/2005 | Corston et al. | | 1/1 |
| 7,027,974 B1 * | 4/2006 | Busch et al. | | 704/4 |

(Continued)

OTHER PUBLICATIONS

Duwairi et al. "Stemming Versus Light Stemming as Feature Selection Technicques for Arabic Text Categorization." IEEE 2008.*

(Continued)

Primary Examiner — Pierre-Louis Desir
Assistant Examiner — David Kovacek

(57) ABSTRACT

A method of stemming text and system therefore are described. The method comprises removing stop words from a document based on at least one stop word entry in an array of stop words and flagging as nouns words determined to be attached to definite articles and preceded by a noun array entry in an array of stop words preceding at least one noun; adding flagged nouns to a noun dictionary; flagging as verbs words determined to be preceded by an verb array entry in an array of stop words preceding at least one verb; adding flagged verbs to a verb dictionary; searching the document for nouns and verbs based on the flagged nouns and the flagged verbs; removing remaining stop words subsequent to searching the document; applying light stemming on the flagged nouns; applying a root-based stemming on the flagged verbs; and storing the stemmed document.

7 Claims, 19 Drawing Sheets

U.S. PATENT DOCUMENTS

| | | | |
|---|---|---|---|
| 7,171,349 B1* | 1/2007 | Wakefield et al. | 704/9 |
| 7,386,441 B2* | 6/2008 | Kempe et al. | 704/9 |
| 7,409,381 B1* | 8/2008 | Steel et al. | 707/741 |
| 7,526,424 B2* | 4/2009 | Corston-Oliver et al. | 704/9 |
| 7,620,539 B2* | 11/2009 | Gaussier et al. | 704/2 |
| 7,769,757 B2* | 8/2010 | Grefenstette et al. | 707/736 |
| 7,860,706 B2* | 12/2010 | Abir | 704/4 |
| 7,987,182 B2* | 7/2011 | Slothouber et al. | 707/722 |
| 8,041,559 B2* | 10/2011 | El-Shishiny | 704/9 |
| 8,090,571 B2* | 1/2012 | Elshishiny et al. | 704/9 |
| 2001/0037328 A1* | 11/2001 | Pustejovsky et al. | 707/3 |
| 2002/0052730 A1* | 5/2002 | Nakao | 704/10 |
| 2002/0116170 A1* | 8/2002 | Corman et al. | 704/1 |
| 2003/0125929 A1* | 7/2003 | Bergstraesser et al. | 704/9 |
| 2004/0122656 A1* | 6/2004 | Abir | 704/4 |
| 2005/0165600 A1* | 7/2005 | Kasravi et al. | 704/9 |
| 2006/0265209 A1* | 11/2006 | Bradford | 704/9 |
| 2007/0016862 A1* | 1/2007 | Kuzmin | 715/700 |
| 2007/0179776 A1* | 8/2007 | Segond et al. | 704/9 |
| 2007/0239433 A1* | 10/2007 | Chaski | 704/9 |
| 2007/0250493 A1* | 10/2007 | Peoples et al. | 707/4 |
| 2007/0265829 A1* | 11/2007 | Turner et al. | 704/9 |
| 2007/0282592 A1* | 12/2007 | Huang et al. | 704/9 |
| 2008/0091408 A1* | 4/2008 | Roulland et al. | 704/9 |
| 2008/0091423 A1* | 4/2008 | Roy et al. | 704/235 |
| 2008/0228748 A1* | 9/2008 | Fairweather | 707/5 |
| 2008/0275694 A1* | 11/2008 | Varone | 704/9 |
| 2008/0300861 A1* | 12/2008 | Emam et al. | 704/9 |
| 2008/0301129 A1* | 12/2008 | Milward et al. | 707/5 |
| 2009/0116741 A1* | 5/2009 | Emam et al. | 382/168 |
| 2009/0150140 A1* | 6/2009 | Cohen et al. | 704/9 |
| 2009/0157382 A1* | 6/2009 | Bar | 704/8 |
| 2010/0076745 A1* | 3/2010 | Oda | 704/1 |
| 2010/0082333 A1* | 4/2010 | Al-Shammari | 704/10 |

OTHER PUBLICATIONS

Ghwanmeh, Sameh et al. "Enhanced Algorithm for Extracting the Root of Arabic Wods." 2009 Sixth International Conference on Computer Graphics, Imaging and Visualization. 2009.*

Hmeidi, Ismail et al. "Design and Implementation of Automatic Indexing for Information Retrieval with Arabic Documents." Journal of the american Society for Information Science. 1997.*

Kanaan, Ghassan et al. "Building an Effective Rule-Based Light Stemmer for Arabic Language to Improve Search Effectiveness." IEEE. 2008.*

Momani, Mohanned and Jamil Faraj. "A Novel Algorithm to Extract Tri-Literal Arabic Roots." IEEE 2007.*

L.S. Larkey, L. Ballesteros, and M.E. Connell, "Improving stemming for Arabic information retrieval: light stemming and Co-occurrence Analysis".

Basic arabic grammar—Document Transcript. Course Code: TAS004A Basic Arabic Grammar Part A Saqib Hussain © Saqib Hussain 2009.

An Arabic Tagset for the Morphosyntactic Tagging of Arabic by Shereen Khoja, Roger Garside and Gerry Knowles. Paper presented at Corpus Linguistics 2001, Lancaster University, Lancaster, UK, Mar. 2001, and to appear in a book entitled "A Rainbow of Corpora: Corpus Linguistics and the Languages of the World", edited by Andrew Wilson, Paul Rayson, and Tony McEnery; Lincom-Europa, Munich.

Khoja stemmer website. 2011, retrieved http://zeus.cs.pacificu.edu/shereen/research.htm.

* cited by examiner

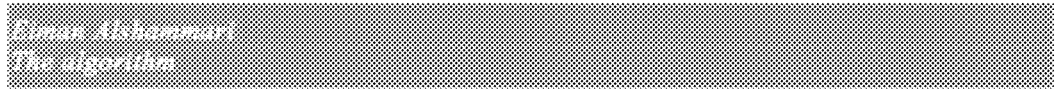

Step one: Saving the Data

Convert all documents, emails, html, presentations to XML. This operation will be done to standardize all the corpus data and to be able to save the title (and the author information if exists). This will help me weight the document title and the author if needed.

Step two: Segmentation

Contrary to English, Arabic sentences tend to be longer and different sentences are merged either by "," or "." Or "?"

Convert ",", and "?" to ".". With the condition that the new constructed sentences are at least two words each.

Step three: cleaning

Delete all "," from the beginning of sentences.

Delete special characters like $, #, > ... and numbers.

Step four: Graph and Matrix construction

A directed graph (asymmetric matrix) is constructed for each xml document.

Step Five: Features

Add extra features to words (Verb and Nouns). This will be done based on the previous word, the following words, and special words.

Rules examples (not all of them....only some)

- If the word is attached to( ﻝ ) then there is no way this word is a verb. (Node in the graph will be flagged as a noun)
- If the word is following (ﺗﺤﺖ , ﻓﻮﻕ , ﻋﻠﻰ , ﻋﺮﺽ) (above, in, under , over) then it is either a word representing a location or a time. Thus these words will be flagged (tagged) as a noun.
- If the word is following (ﻫﻢ , ﺃﻧﺘﻢ , ﻟﻜﻢ , ﺃﻧﺖ) –(you, they , them..) then it is either a word representing a location or a time. Thus these words will be flagged (tagged) as a noun.
- Same above rules apply if the word previous word belongs to ( .. ﻭﺇﻥ). ﻭ

A word following a noun is a noun if not separated by any special character like (. ، ؛ـ)

Step six: Partial stem

Now after all words (nodes) starting with (ﻝ) are flagged , (ﻝ) is no longer needed, this means strip the word from (ﻝ), update the graph if needed.

Step seven: cleaning again

We no longer need to keep the stop words we used before to identify nouns, thus we delete them now. Reconstruct the graph

FIG. 3a

*Example :*

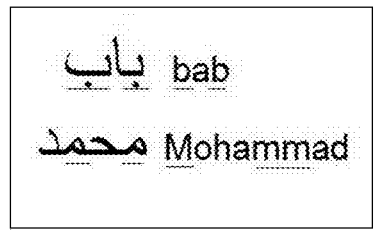
FIG. 20
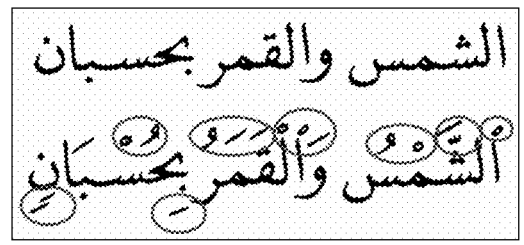
FIG. 21
حُبَّ حَبَ
FIG. 22
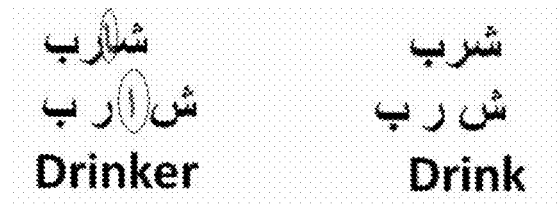
FIG. 23

LEMMATIZING, STEMMING, AND QUERY EXPANSION METHOD AND SYSTEM

RELATED APPLICATIONS

The present application claims priority from prior filed provisional application 61/057,280, filed on May 30, 2008, and incorporated herein by reference in its entirety.

BACKGROUND

The Internet is witnessing an explosive growth in the field of information search and retrieval. When retrieval systems and search engines were first introduced, they were directed to serve academic professionals seeking knowledge purely in English. Thus, only English language skills were needed to form meaningful queries and to read and analyze search results. The Internet evolved from serving only academia to serving other fields like tourism, politics, industry, medicine, and commerce, in addition to the general population. The following are examples of some of these services:

- Medicine—Being able to retrieve information about a specific disease and possible treatments, especially with the appearance of rare and new diseases in specific regions.
- Research—Searching for all publications about a specific topic.
- Environmental—Checking weather forecasts and analyses.
- Tourism—Viewing historical tourism information on countries and regions.
- Political—Analyzing the news.
- Commerce—Monitoring stock market activities.
- Homeland Security—Checking for suspects' records online, and tracking suspects' e-mails and connections.

The rapid growth of the Internet continued to serve many non-English speaking nations.

Arabic is the seventh most widely spoken language in the world and the official language of over 29 countries. In addition, there are native Arabic speakers scattered all over the world.

According to the Internet World Stats, there are 59,853,630 Arabic speaking people using the Internet representing 4.1% of all the Internet users in the world. Additionally, the number of Arabic speaking Internet users has grown 2,063.7% in the last eight years (2000-2008).

Due to the complicated morphological structure embedded in the Arabic language, text processing is hard to perform compared to other languages. Text processing is the main step shared among Information Retrieval (IR), text mining, natural language processing and many other applications. The efforts to improve Arabic information search and retrieval processes compared to other languages are limited and modest, thus there is an urgent need for effective Arabic information search and retrieval tools.

Text processing (or document processing) is a process that includes tokenization, normalization, stop words removal, and stemming. Tokenization is breaking the text into tokens (i.e. words), where normalization involves transforming text to insure consistency. Some examples of this process include converting upper case letters to lower, Unicode conversion, and removing diacritics from letters, punctuations, or numbers. Stop words (or stopwords), or stop lists (or stoplists) are list of words that are filtered out prior to, or after, the processing of text based on their level of usefulness in a given context. Finally, stemming is a computational process for reducing words to their roots (or stems).

Stemming is a computational process for reducing words to their root (or stem), and it can be viewed as a recall-enhancing device or a precision-enhancing device.

Stemmers are basic elements in query systems, indexing, web search engines and information retrieval systems (IRS).

Arabic language is a semantic language with a composite morphology. The words are categorized as particles, nouns, or verbs. There are 29 letters in Arabic, and the words are formed by linking letters of the alphabet.

Table 1 below shows a list of Arabic letters.

TABLE 1

| ا | ب | ت | ث | ج | ح |
|---|---|---|---|---|---|
| Alif | Baa | Taa | Thaa | Jeem | Haa |
| خ | د | ذ | ر | ز | س |
| Kha | Daal | Thaal | Raa | Zaay | Seen |
| ش | ص | ض | ط | ظ | ع |
| Sheen | Saad | daad | Taa | Thaa | Ayn |
| غ | ف | ق | ك | ل | م |
| Ghayn | Faa | Qaaf | Kaaf | Laam | Meem |
| ن | ه | و | ي | ء | |
| Noon | Ha | Waaw | Yaa | Hamza | |

Unlike most Western languages, Arabic script is written from right to left. The letters are connected and do not start with capital letter as in English. Due to the unique characteristics of Arabic language, one particularly challenging task for machines is to recognize and extract proper nouns from Arabic texts.

In English, words are formed by attaching prefixes and suffixes to either or both sides of the root. For example the word Untouchables is formed as follows

| Un | touch | able | s |
|---|---|---|---|
| Prefix | Root | First Suffix | Second Suffix |

In Arabic, additions to the root can be within the root (not only on the word sides) which is called a pattern. This causes a serious issue in stemming Arabic documentation because it is hard to differentiate between root particles and affix particles.

Table 2 below displays an example of the Arabic Word= الشارب (drinker) and its stems with the common prefixes and suffixes.

TABLE 2

| Prefixes + Stem (Root + Pattern) + Suffixes | | |
|---|---|---|
| Root | شرب | drink |
| Prefixes | ال | the |
| Stem | شارب | drinker |
| Suffixes | ان, ين | dual |
| Suffixes | ون | plural |
| Suffixes | ة | feminine |
| ابن الشاربي الشارب | the drinkers (dual) | |
| ني الشارب | the drinkers (plural) | |
| الشارب | the drinker (masculine) | |
| الشاربة | the drinker (feminine) | |

Mis-stemming is defined as "taking off what looks like an ending, but is really part of the stem," and over-stemming is "taking off a true ending which results in the conflation of words of different meanings".

Arabic stemmers blindly stem all the words and perform poorly especially with compound words, proper nouns and foreign Arabized words. The main cause of this problem is the stemmer's lack of knowledge of the word lexical category (i.e. noun, verb, proposition, etc.)

A possible solution for this problem is to add a lookup dictionary to check the roots. Although this solution seems straightforward and easy, this process is computationally expensive. It has been estimated that there are around 10,000 independent roots. Each root word can have prefixes, suffixes, infixes, and regular and irregular tenses.

Another solution is to define a rule to stem words instead of chopping off the letters blindly; this rule is set by the syntactical structure of the word. For example verbs require aggressive stemming and need to be represented by their roots. Nouns on the contrary only require light suffixes and prefixes elimination. This advanced stemming is known as Lemmatization.

Lemmatization is a normalization technique, generally defined as "the transformation of all inflected word forms contained in a text to their dictionary look-up form".

To the inventor's knowledge, there has been no proposed algorithm for Arabic Lemmatization.

The structure of Arabic makes it harder to stem the words to their roots. Common stemming errors that stemmers suffer from include over-stemming, under-stemming, and mis-stemming.

The automated addition to the syntactic knowledge reduces both stemming errors and stemming cost.

The current Arabic stemming approaches only focus on the morphological structure. Ignoring Arabic basic rules can cause errors in automatic translation, text clustering, text summarization, and NLP.

Stemming algorithms rely on Arabic language morphology only, the addition of the syntactical knowledge creates what is known as a lemmatizer in linguistics.

Both stemming and lemmatization share a common goal of reducing a word to its base. However, lemmatization is more robust than stemming as it often involves usage of vocabulary and morphological analysis, as opposed to simply removing the suffix of the word.

Arabic language is a semantic language with a composite morphology. Arabic language stemming was done manually prior to TREC (Text Retrieval Conference) and only applied on small corpora. The most common Arabic stemming approaches are the root-based and the light stemmers.

Automatic Arabic stemmers proved to be an effective technique for Text Processing for small collections (Al-Kharashi, 1991; Al-Kharashi & Evans, 1994) and large collections (Larkey, Ballesteros, and Connell 2002).

Xu et al. (2002) showed that spelling normalization combined with the use of tri-grams and stemming could significantly improve Arabic Text Processing by 40%. The two most effective Arabic stemmers are Larkey's et al. (2003) and Khoja's (Khoja and Garside 1999) root-extraction stemmer. On the other hand, Duwairi (2005), El-Kourd et al. (2004), and Mustafa et al. (2004) discovered that N-gram stemming technique is not efficient for Arabic Text processing. In summary, Arabic stemming produced promising results in some applications and failed in others.

This approach can be applied to serve English stemming and lemmatization, the current English stemmers aggressively stem the words which can cause the loss of the meaning. Prior knowledge to the word's type (i.e noun or verb) can lead us to the appropriate stemming.

Tokenization is a fundamental step in processing textual data preceding the tasks of information retrieval, text mining, and natural language processing. Tokenization is a language dependent approach, including normalization, stop words removal, lemmatization and stemming.

The current approach in word tokenization (segmentation) is to extract single words (tokens) from a given document by replacing punctuation marks and non-textual characters by white spaces.

This approach is language independent and applied on both Arabic and English.

Due to this approach, compound words and phrases composed of two or more words are processed separately formatting new words with a totally different meaning.

This issue is more profound in Arabic language where specific phrases and complex (compound) words are used heavily.

The replacement of punctuation marks with white spaces causes another problem, in Arabic language sentences are usually longer and sentences are either separated by a """ or ":"

The current approach is to replace the """ with a space which causes a merge of individual sentences.

DESCRIPTION OF THE DRAWINGS

One or more embodiments are illustrated by way of example, and not by limitation, in the figures of the accompanying drawings, wherein elements having the same reference numeral designations represent like elements throughout and wherein:

FIG. 3a is an illustration of another high-level process flow of an embodiment and FIG. 3b is an example of an embodiment;

FIG. 20 is a depiction of Arabic characters shapes differing in their position in the word changes;

FIG. 21 is a depiction of un-vocalized and vocalized Arabic text;

FIG. 22 is a depiction of two similar words with different meanings; and

FIG. 23 is depiction of an Arabic infix example.

DETAILED DESCRIPTION

In at least some embodiments, a process for stemming, responsive to receipt of at least one input of an Arabic-based document, generates an output comprising one or more of a stemmed document, a noun corpus, or a verb corpus.

An embodiment of the stemming process is now described wherein:

D: a two dimensional array representing the document of size 2*M, where d1i represents the word and d2i represents the word type.

N: a Noun corpus which is a global one dimensional array sorted alphabetically. The array contains an automatically generated list of nouns found in the input documents.

V: a Verb corpus which is a one dimensional array sorted alphabetically. The array contains an automatically generated list of verbs found in the corpus.

NSW: an array of stop words preceding nouns.

VSW: an array of stop words preceding verbs.

SW: an array of stop words (including both NSW and VSW).

Figure 4:
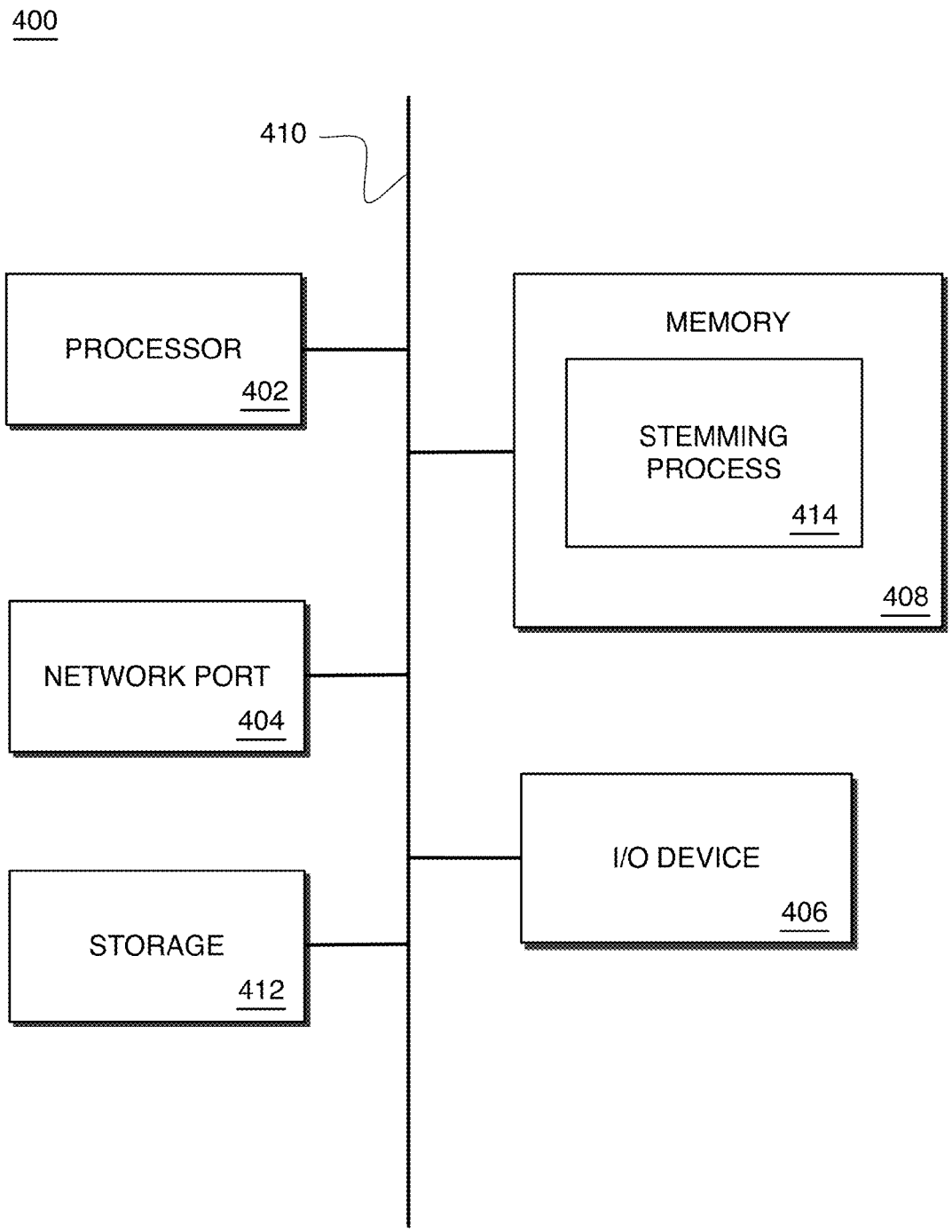
FIG. 4 is a high-level functional block diagram of a computer system in conjunction with which an embodiment may be performed.

FIG. 4 depicts a high-level functional block diagram of system 400, e.g., a computer system, according to an embodiment. System 400 comprises a processor 402, a memory 408, a network interface (I/F) 404, a storage 412, an input/output device 406, and one or more hardware components 108 communicatively coupled via a bus 410 or other interconnection communication mechanism.

Memory 408 (also referred to as a computer-readable medium) may comprise a random access memory (RAM) or other dynamic storage device, coupled to the bus 410 for storing data and instructions to be executed by processor 402, e.g., a stemming process 414 according to an embodiment, a kernel/operating system, one or more userspace applications, portions of the kernel and/or the userspace applications, and components thereof. Memory 408 also may be used for storing temporary variables or other intermediate information during execution of instructions to be executed by processor 402. Memory 408 may also comprise a read only memory (ROM) or other static storage device coupled to the bus 410 for storing static information and instructions for the processor 402.

Network I/F 404 comprises a mechanism for connecting to another device. In at least some embodiments, system 400 comprises more than a single network interface.

A storage device (storage 412), such as a magnetic disk or optical disk, may also be provided and coupled to the bus 410 for storing data and/or instructions, e.g., stemming process 414, etc.

I/O device 406 may comprise an input device, an output device and/or a combined input/output device for enabling user interaction system 400. An input device may comprise, for example, a keyboard, keypad, mouse, trackball, trackpad, and/or cursor direction keys for communicating information and commands to processor 402. An output device may comprise, for example, a display, a printer, a voice synthesizer, etc. for communicating information to a user.

The functions of a method described in connection with the embodiments disclosed herein may be embodied in hardware, software, or a combination thereof. Software comprising instructions for execution may reside in a computer-readable medium comprising volatile and/or non-volatile memory, e.g., a random access memory, a read only memory, a programmable memory, a hard disk, a compact disc, or another form of storage medium readable, directly or indirectly, by a processing device.

---

Arabic/English Lemmatization (Advance Stemming) Algorithm

Input: Arabic document
Output: Stemmed document.
Noun Dictionary.
Verbs Dictionary.
V: Verb dictionary (one dimensional array sorted alphabetically[1])
N: Noun dictionary (one dimensional array sorted alphabetically)
NSW: Array of stop words proceeding nouns
VSW: Array of stop words proceeding verbs
SW: Array of stop words (including both NSW and VSW)
Phase 1: Tokenize the document and merge compound words
Phase 2: Remove useless stop words.
Phase 3: Simple Noun identification
Locate words attached to definite articles, and preceded by NSW and flag them as Nouns
Phase 4: Suffix and Prefix removal
Apply suffix and prefix approach to the entire document. Longest suffixes and prefixes are removed first.
Phase 5: Noun Dictionary Generation
Add the identified processed words to N.
Phase 6: Verbs Identification
Verbs are proceeded by VSW
Phase 7: Verb Dictionary Generation
Add the identified processed words to N
Phase 8: Find all noun tokens
Phase 9: Stop Word Removal
Remove useful and useless stop words
Phase 10: Root Extraction for Verbs
Roots are extracted by comparing Verbs to Arabic Root patterns, words (tokens) with missing tags are considered nouns and lightly stemmed.

[1]For fast lookup, these dictionaries can be implemented as hash tables

---

Tokenization often performs stop words removal early in the process, although there is currently no standardized list of Arabic Stop Words. The current available list introduces less than 200 words.

The inventor has been able to define more than 2,200 stop words and categorize them into useful and useless stop words. Useless stop words are stop words that are used extensively and give no benefits to the subsequent words. Useful stop words are words that can indicate the syntactical categories of the subsequent words. For example, in an English sentence such as "I went to school yesterday," it is easy to realize that school is a noun and thus does not require aggressive stemming.

Unfortunately, due to the early removal of the stop words, we lost this valuable information. The same scenario applies to Arabic language too. We believe that the useful stop words can help us identify nouns and verbs and direct us into the appropriate stemming. Our algorithm can also be considered as an advanced stemmer, in which identified nouns and verbs are used to generate global nouns and verbs dictionaries. The benefit of these dictionaries is to find similar nouns in the corpus that were used differently in other sentences. For example in the following paragraph the word School is identified as a noun and was recognized as a noun in the following sentence.

I went to school yesterday, I love school.

Our stop words list was initially generated by three methods; English stop words translation, identification of common words in arbitrary Arabic documents, and manual search of synonyms to the previously identified stop words.

As shown and described, one or more embodiments of the present algorithm consists of different phases. During the first phase, complex consecutive words are combined, the separating space is removed and the document is updated.

In the second phase, useless stop words are removed to reduce the size of the corpus. Next, identify nouns by either locating noun preceding stop words or words starting by definite articles. These nouns are lightly stemmed by removing suffixes and prefixes and then added to the global nouns dictionary. At this level, these words are flagged as nouns as a preparation to the stemming phase. In parallel to that process verbs are found by locating verbs preceding stop words. Similar to the nouns, the verbs are added to the global verb dictionary and tagged as verbs.

In Arabic, there cannot be two consecutive verbs, thus any word following a verb is either a stop word or a noun. If the word is not a stop word then the word is added to the noun dictionary and flagged as a noun.

Before we direct a word to the appropriate stemming by the word flag, all the stop words are removed since they offer no further advantage. Other words that do not belong in any category will be treated as nouns and stemmed lightly.

Figure 3B:
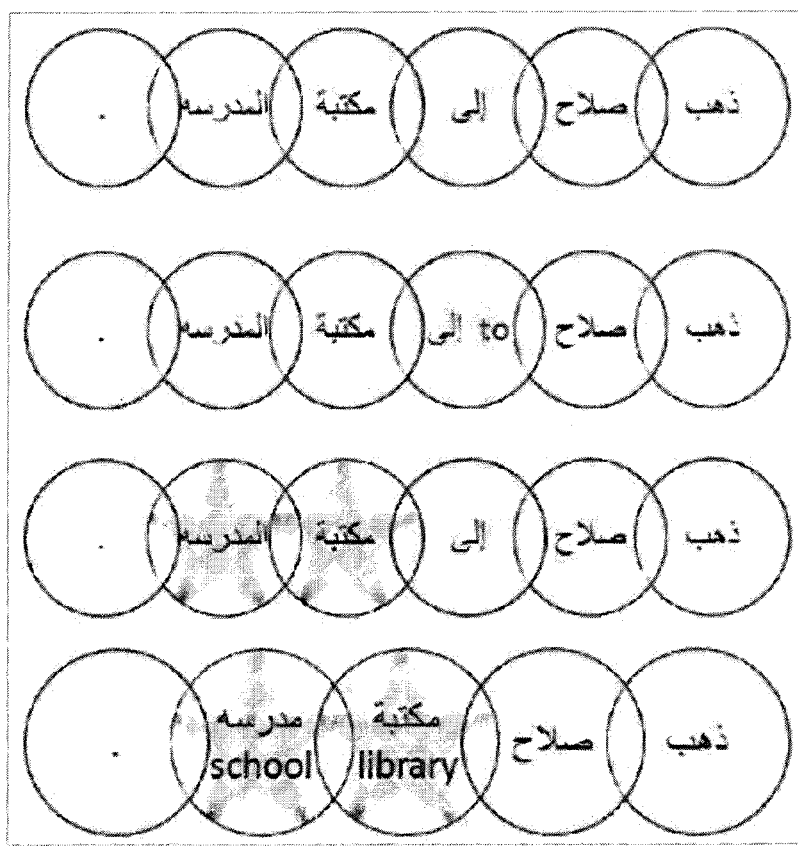

FIG. 3a is a description of an algorithm according to an embodiment. As we notice in the example (FIG. 3B) that we are able to identify two nouns by just finding the special word (t). In summary this algorithm is different than other algorithms. This algorithm considers stop words removal and stemming a recursive process and differentiates between stop words. Identifying nouns can also lead to identifying names which is another big problem in IR. The rules stated in this document are not all the rules, in the learning process we might discover new rules. By recognizing nouns we will reduce the extra calculations required for stemming and root extraction, not all the words need to be extracted. In other stemming techniques, words that represent a location and time can not be found since the word is stemmed to a meaningless root.

Methodology

The process of developing our stemmer passed through two different main phases: the hybrid model and the content-based dictionary model.

Both models start with the pre-processing stage. This essential stage consists of Unicode conversion, tokenization, and normalization.

Offline and online Arabic content is usually encoded in CP-1256 (windows Arabic), ISO 8859, or Unicode (UTF8/UTF16). To standardize our stemmer, we converted all the tested documents to Unicode encoding (UTF16).

The tokenization process, as we defined it previously, is simply breaking the text into tokens i.e., words. The last pre-processing stage is normalization and it is highly necessary due to the various writing styles and the exchangeability of some letters.

The hybrid model uses the syntactical knowledge gained from word ordering and employs it to control the strength of stemming, i.e., aggressive or light. After creating the model in Java, we stemmed multiple Arabic documents using the new stemmer and evaluated the output. This evaluation led to a discovery of shortcomings in the initial model performance and a modified model was needed.

This portion discusses in depth the development stages of the new Educated Text Stemmer (ETS). Section one will cover the shared pre-processing stage, followed by the initial hybrid model presented in section two. We conclude the chapter with an exploration of the practical problems and weaknesses in the initial model and how they were solved in the modified model.

Initial Pre-Processing

Prior to applying stemming and after converting all the files to Unicode, normalization was performed to make the data sets more consistent. Normalization consisted of the following steps:

Remove diacritics and punctuation.
Remove non-letters (for example, numbers, and percentage signs).
Replace آ with double alif.
Replace initial إ, أ, ا with ا.
Replace all hamza forms ئ, ؤ with ء

After going through the pre-processing stage, the documents are ready for stemming using our algorithm discussed below.

Initial Algorithm

Stop words (functional word or structural word list) are words that either carry no meaning or are very common and thus, do not represent the document. Stop word lists usually contain prepositions, pronouns, and conjunctions. Text processing often performs stop word removal early in the process, and there is currently no standardized list of Arabic stop words. In an attempt to standardize this stage in Arabic text processing, I introduced a stop word list with more than 3,700 words and categorized them into "useful" and "useless" stop words. Our stop word list was initially generated using three methods: English stop word translation, identification of common words in arbitrary Arabic documents, and manual search of synonyms of the previously identified stop words.

Useless stop words are stop words that are used extensively and add nothing to subsequent words. In contrast, useful stop words are words that can indicate the syntactical categories of the subsequent words. For example, in an English sentence such as "I read a book yesterday," it is easy to see that book is a noun since it comes after the letter a, and thus it does not require aggressive stemming.

An example of useless stop words are conjunctions (like و, او) and relative pronouns (like الذي, هو, اللذين). An example of useful stop words is prepositions. Arabic prepositions can precede nouns and verbs (example: the, a, over, etc.). Examples of these types of prepositions are shown in Table 3 and Table 4.

We believe that useful stop words can help identify nouns and verbs and direct us as to the appropriate strength of stemming. Unfortunately, due to the early removal of stop words in previous algorithms, valuable information was lost. The main idea of the stemming algorithm is to use the syntactical knowledge gained from the content itself to tag the words as nouns or verbs and to use this knowledge to control the level of stemming needed, i.e., aggressive or light. Contrary to what has been discussed in the literature, no tree bank or external dictionary is needed for tagging words.

TABLE 3

Arabic Preposition Preceding Verbs

| Preposition | English |
|---|---|
| حيثما | Wherever |
| كلما | Whenever |
| إذا | If |
| عندما | When (not for question) |

In addition to the use of the previous stop words technique, automated tagging can be achieved by other techniques:
1. Verbs are never attached to definite articles.
We cannot have two consecutive verbs, thus any word following a verb is either a stop word or a noun.

2. Verb patterns, eg., Table 5 can be distinguished from noun patterns (Table 3 and Table 4).
3. "ta'a" marboota can be only a suffix with a noun.
4. Global noun and verb dictionaries are automatically generated; the advantage of these dictionaries is that they find similar nouns in the corpus that were used differently in other sentences. For example, the word "book" is identified as a noun and was recognized as a noun in the following sentences: I read a book yesterday. I love books.

Figure 5:
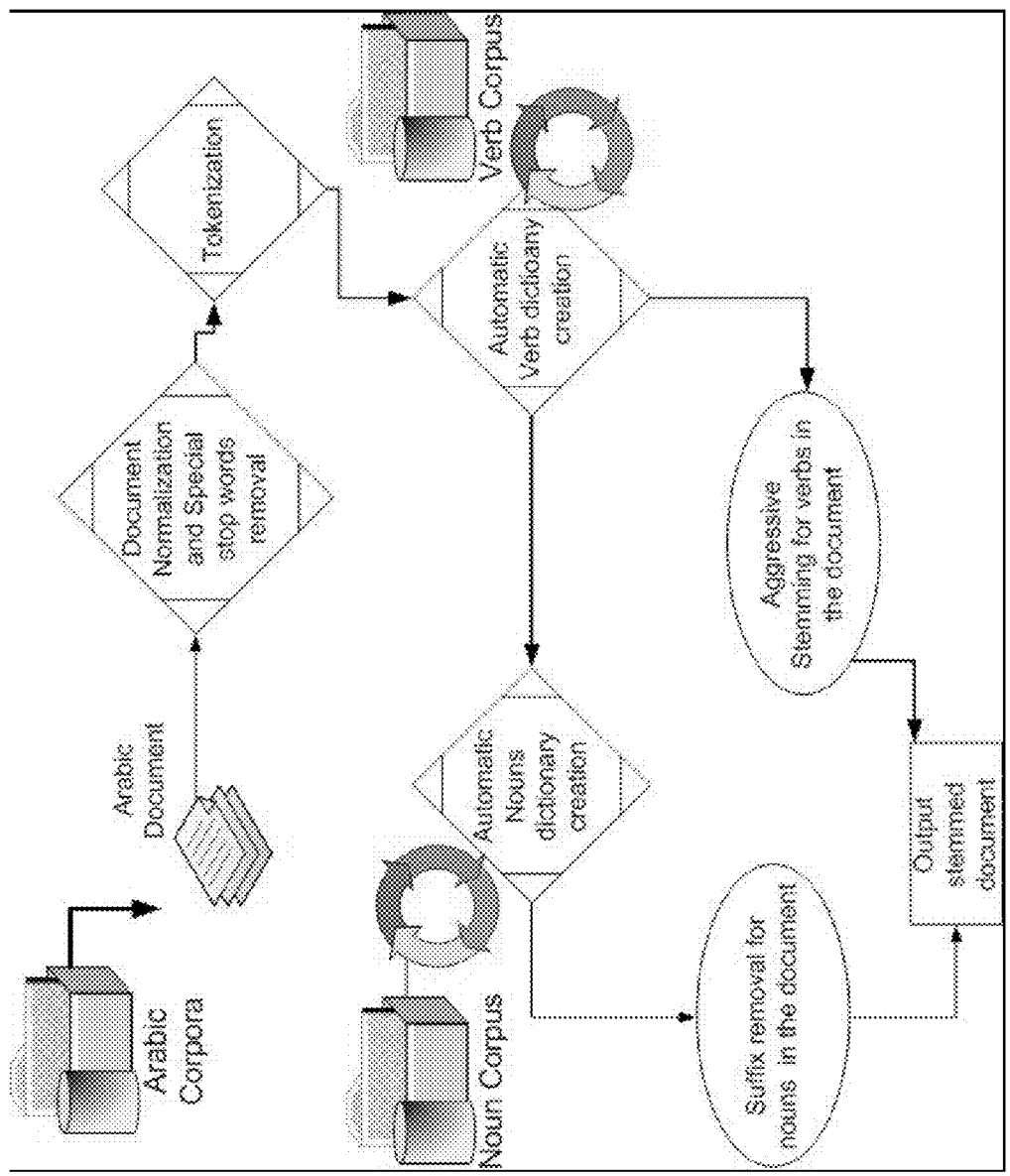
FIG. 5 is a high-level process flow diagram of a method according to an embodiment.

After the pre-processing stage, useless stop words were removed to reduce the size of the corpus (shown in FIG. 5).

As explained previously, tagging techniques were used to distinguish between nouns and verbs. Nouns were identified and flagged in preparation for the stemming phase. Similar to nouns, verbs were added to the global verb dictionary and tagged as verbs.

Verbs were stemmed using the Khoja root-based stemmer and nouns were lightly stemmed using the light10 technique. The new stemmed nouns and verbs were also added to the noun and verb dictionaries respectively.

The document was revisited by categorizing words with missing flags using the noun corpus and the verb corpus as lookup tables.

TABLE 4

Arabic Prepositions Indicating Time and Place, Preceding Nouns

| Preposition | English Equivalence |
|---|---|
| إلى | until, near, towards, to |
| أمامَ | in front of |
| الا | But |
| اعلى | Top |
| أسفل | Down |
| باتجاه | On the direction of |
| بجانب | Aside, next to, beside |
| بعد | After |
| بينَ | Between |
| تحتَ | Under |
| حاشا | Forbid |
| خارج | Outside of |
| خلال | Through, during, |
| حتى | Till (time &location) |
| عبر | Through |
| على | Over |
| عن | On |
| عدا | Except |
| فوق | Above, up |
| في | In |
| عند | at |
| غير | However |
| قبل | Before |
| مذ | since |
| منذ | since |
| من | of |
| ماعدا | except |
| سوى | only |
| قبلَ | Before |
| قريب | Near |
| منذ | since |
| وراءَ | Behind, Beyond |
| ليس | Not |
| ليسوا | Are not |
| ليستا | Are not |
| لأن | Because |

TABLE 5

Verb Patterns

| Verb - Present Tense | Example |
|---|---|
| فعل - يفعل | أكل - يأكل |
| فاعل - يفاعل | قاتل - يقاتل |
| أفعل - يفعل | أسلم - يسلم |
| تفعل - يتفعل | تكلم - يتكلم |
| تفاعل - يتفاعل | تساءل - يتساءل |
| إنفعل - ينفعل | إنفعل - ينفعل |
| إفتعل - يفتعل | إعتمد - يعتمد |
| إفعل - يفعل | إصفر - يصفر |
| إستفعل - يستفعل | إستعمل - يستعمل |

Figure 9:
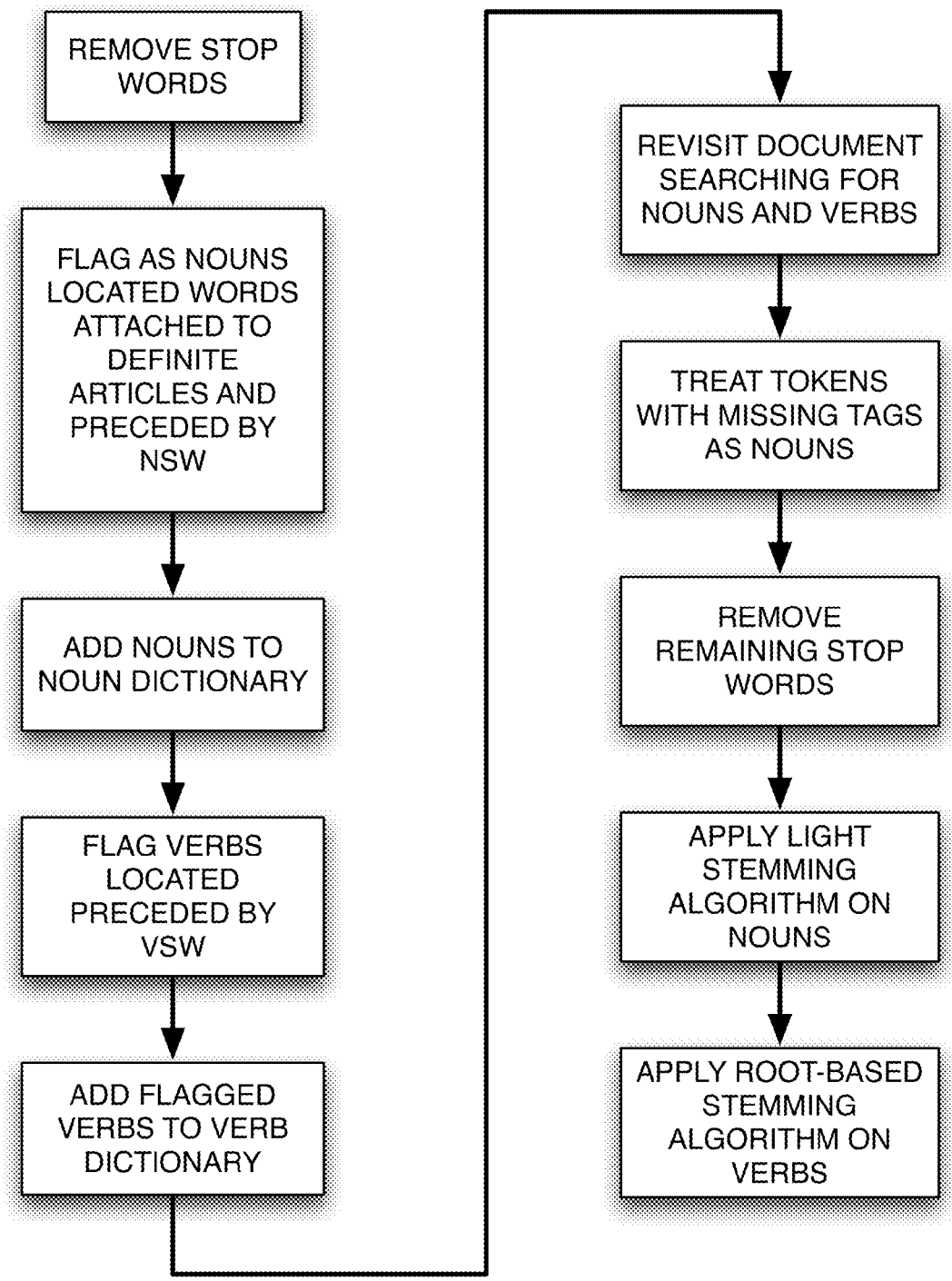
FIG. 9 is a high-level process flow diagram of a method according to an embodiment.

Nouns usually co-occur in the same document, thus the lookup table allowed us to identify un-flagged nouns. Other words that do not belong to any category were treated as nouns and stemmed lightly. Before we directed a word to the appropriate level of stemming in keeping with its word flag, all the remaining useful stop words were removed since they offered no further advantage. Table 6 below summarizes the algorithm and FIG. 9 depicts a process flow according to a method embodiment corresponding to execution of a sequence of instructions stored in memory 408 (FIG. 4) by processor 402.

FIG. 5 depicts an embodiment of the educated Arabic Stemming Algorithm Simplified.

TABLE 6

The Educated Text Stemmer (ETS) Arabic Stemming Algorithm

ETS
Input: Arabic document
Output: Stemmed document.
Noun Dictionary.
Verbs Dictionary.
V: Verb dictionary (one dimensional array sorted alphabetically[2])
N: Noun dictionary (one dimensional array sorted alphabetically)
NSW: Array of stop words proceeding nouns
VSW: Array of stop words proceeding verbs
SW: Array of stop words (including both NSW and VSW)
1. Remove useless stop words
2. Locate words attached to definite articles, and preceded by NSW and flag them as Nouns
3. Add nouns to the noun dictionary N.
4. Locate Verbs proceeded by VSW. Flag verbs in the document.
5. Add the identified Verbs to the verb dictionary V.
6. Revisit the document searching for nouns and verbs existing in the document.
7. Tokens (words) with missing tags are treated as nouns.
8. Remove the rest of the stop words (useful stop words).
9. Apply light stemming Algorithm on nouns.
10. Apply Khoja's root-based stemmer on verbs.

[2]For fast lookup, these dictionaries can be implemented using hash tables

The initial hybrid model uses the corpus itself to distinguish between nouns and verbs. This model could be considered the first stand-alone, automated grammatical tagger for Arabic.

Figure 6:
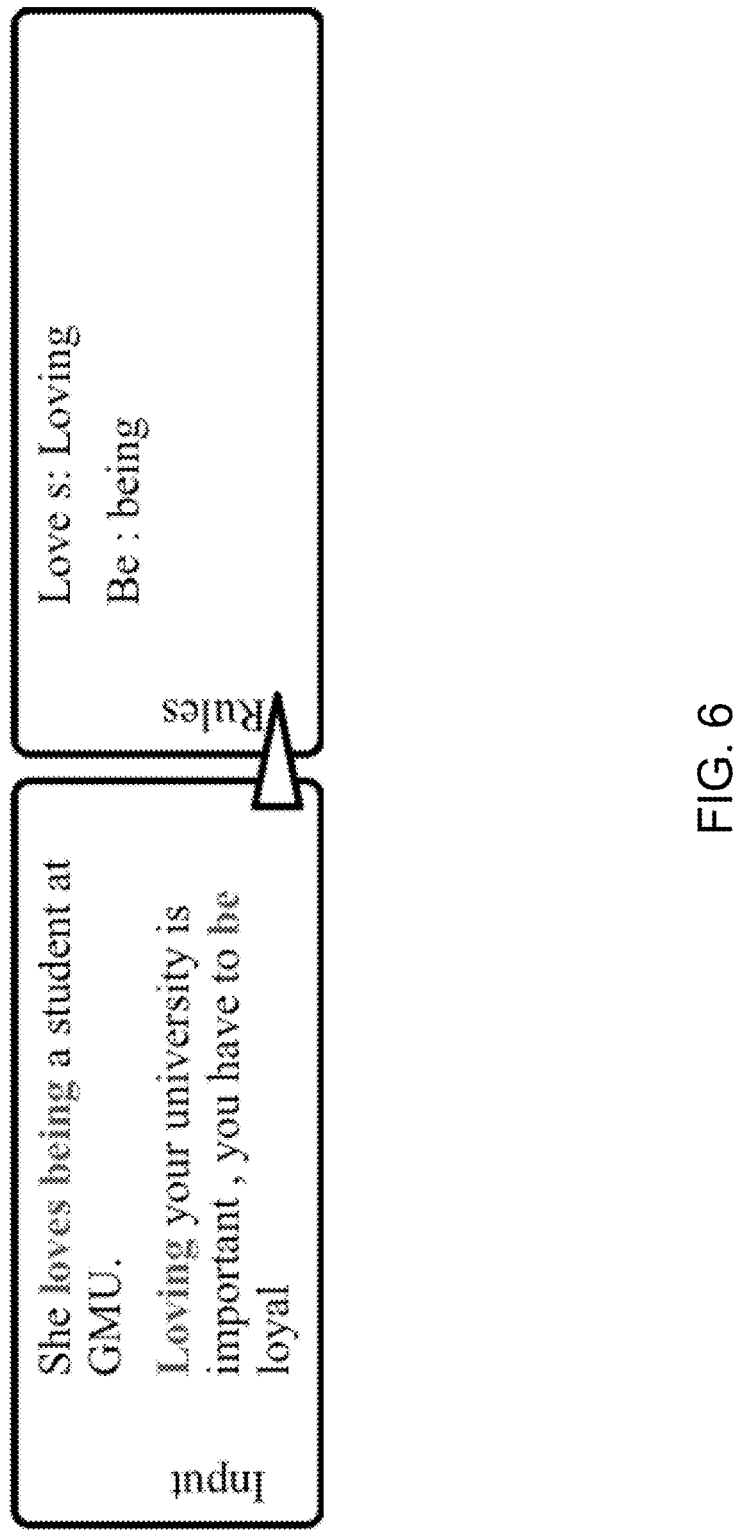
FIG. 6 is a local stemming example.

Because stemming is reducing the vocabulary size by reducing variant words to a single stem, we saw it as clustering syntactically related words. For this purpose, we defined a new concept called the "local stem." A local stem is the shortest form of a word among syntactically related words in a document. For example, in the document shown in FIG. 6, the words "loves" and "loving" are syntactically related, as are the words "be" and "being." In this case, both "loves" and "be" are local stems. Although the word "loves" is not the root, it is the local stem for our document.

Whenever a prefix or a suffix is detected and removed, the input corpus is used as a content-based dictionary to perform spell checking. The input document words are stored in a one-dimensional array where the morphologically related words are clustered based on a simple string matching algorithm: the local stem is the shortest word in a group. This process was performed on all the documents and the rules were gathered in a single file. The learned clustering rules were stored in text files and referred to as "concept groups."

Although using string matching is inefficient, this learning process can be applied in parallel on various subsets of the input data set and the new rules can be combined prior to moving to the second stage. In addition, the learned rules for the current dataset can be applied directly on new datasets without performing the learning (rule discovery) stage. As a future effort, we would like to replace the string matching technique by a fast string searching algorithm.

As we learned the clustering rules from the input corpus automatically, the Java-based program (the second stage) then used the concept groups to stem the corpus where all of the words in a cluster would be replaced by the local stem.

Our new algorithm was augmented by cohesive prefix and suffix lists (Table 7 and Table 8) and executed two major stages: rule building and stemming.

Below, we discuss how to use the formed concept groups in query expansion to improve information retrieval systems' effectiveness.

Breaking the process into two stages was necessary for several reasons. First, it aided us in the training process and gave us the ability to enhance the algorithm as errors appeared in the concept groups. Also, in the case of stemming short documents and queries, we could perform stemming with previously learned rules from longer documents and we could immediately use the second stage of the program using the second Java application. Finally, by separating the two stages we allow users to include their own rules when needed. Examples of cases where a user might need to supervise the stemming process are:

1. Adding patterns: The Arabic language has 29 plural patterns (Table 9). Some of these plurals can be converted to a singular form by suffix removal only, but for other forms of plurals, called irregular plurals or broken plurals, patterns are needed to find the singular form.
2. Unifying synonyms: Arabic is a rich language where one word can be expressed in many ways. For example, the word "computer" can be written with three different forms: "hasib," حاسب or حاسوب "hasob" or كمبيوتر, "computer." In this case, a user can create a rule by choosing one of these words to be the local stem, i.e., Computer: hasib, hasob. Applying this rule is useful, especially in information retrieval applications.
3. Reducing ambiguity: We can choose to replace a term that causes confusion with another term. For example, if a shared word between two fields makes it difficult to distinguish between the two fields, a user might wish to replace the word in a specific category with another word. An example of this is the word "virus," which exists in the medical and technology field. This word can create confusion in classifying or clustering documents. The user might decide to replace the word "virus" with a synonym.
4. Finally, in the vector space model, the user can increase or decrease the weight of some words by choosing the rules to include in the stemmer.

Figure 7:
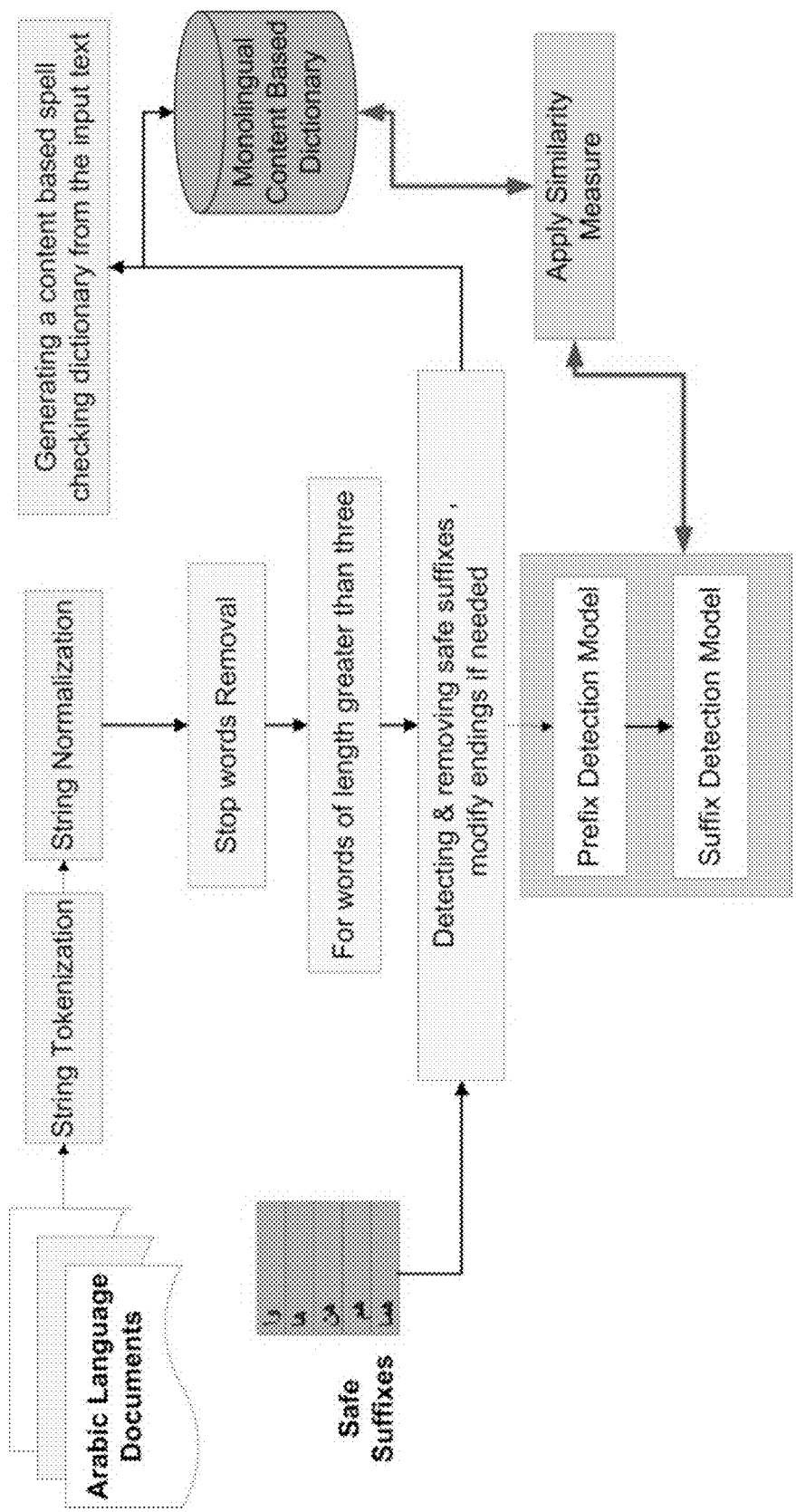
FIG. 7 is a high-level process flow diagram of a method embodiment of a pre-processing process.

FIG. 7 demonstrates the first stage of the algorithm (preprocessing) in detail. This is followed by stop word removal. Among the list of Arabic suffixes, some are safe to remove because they cannot be part of a root. Removing these suffixes might create a need to modify the ending in one case that involves converting the "ت" ta'a maftooha to "ة" ta'a marboota.

After this step, in at least some embodiments, all the words are stored in the monolingual content-based stemmer for use as a spell checker.

In at least some embodiments, subsequently, prefixes are detected in every word by removing a list of possible prefixes stored in an external text file and performing a string-matching algorithm between the word and other words in the monolingual dictionary. If a match is detected, then a clustering rule is created and the new rule is added to the rules text file. The same process is performed with the infixes stored in another external text file.

Figure 8:
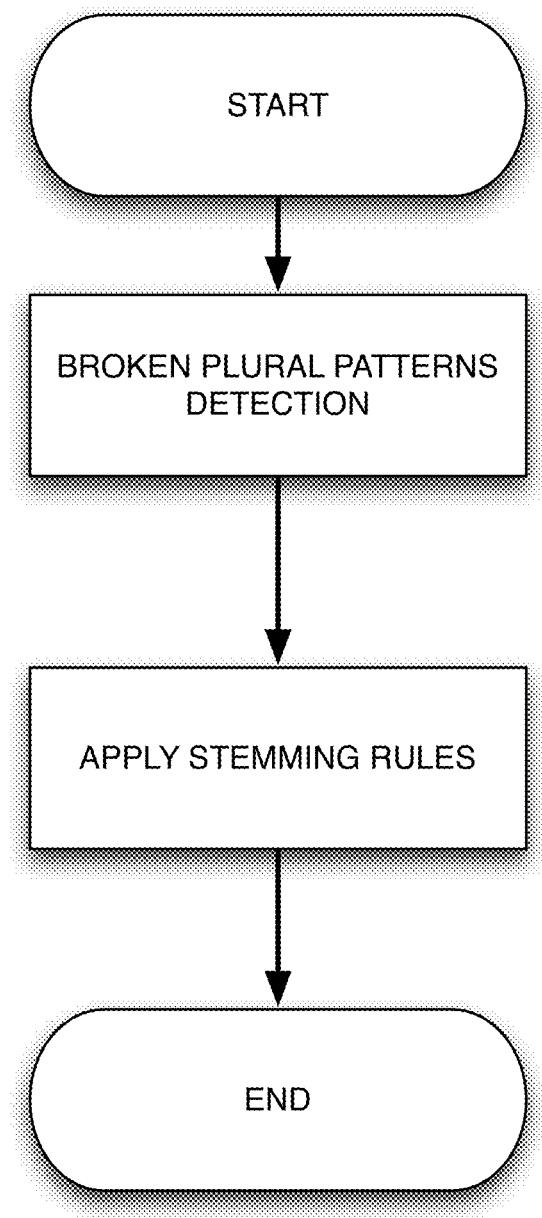
FIG. 8 is a depiction of an embodiment of use of rules and extra patterns to stem documents and create modified stemmed documents.

FIG. 8 demonstrates how the rules and extra patterns are used to stem the documents and create the modified stemmed documents.

TABLE 7

Prefixes (Arabic prefix table with Length1–Length4 rows)

TABLE 8

Suffixes (Arabic suffix table with Length1–Length7 rows)

The similarity measure is calculated by using a simple string matching. The string matching procedure counts the matching letters between word1 and word2 and normalizes the counting by dividing the count by the length of the shorter word.

Similar words are words that achieve a normalized matching value of 1. The user has the freedom to reduce the matching threshold to 0.7 or 0.8 depending on the nature of the task. For noisy documents, a user might need to reduce the matching threshold to 0.9 or 0.8.

TABLE 9

Plural Patterns

| Example | Pattern |
|---|---|
| أربعة | أفعلة |
| أعين | أفعل |
| فتية | أفعل |
| كتب | فعل |
| خضر | فعل |
| غرف | فعل |
| جرحى | فعلى |
| قضبان | فعلان |
| ركع | فعل |
| منازل | مفاعل |
| قوافل | فواعل |
| صحارى | فعالى |
| صحائف | فعائل |
| شعراء | فُعَلاء |
| قردة | فِعَلة |
| نعم | فعل |
| غلمان | فعلان |
| طلبة | فَعَلة |
| أصحاب | أفعال |
| تأكما | فعاة |
| قلوب | فعول |
| عصافير | فاعيل (رباعي) |
| أفاضل | أفاعل |
| أناشيد | أفاعيل |
| بحار | فعال |
| مفتوح | مفاعل |
| أصدقاء | أفعلاء |
| حراس | فُعال |

By changing the group of suffixes and prefixes, the algorithm can be applied to other languages. An English example is shown in Table 10.

TABLE 10

The First Stage Output for English Language arab: arabic, arabian, arabi, arabs, arabia
less: lesser
language: languages
term: terms
africa: african, africans
different: differentiation, differences
exist: existing
region: regional
intelligible: unintelligible
use: used, uses
common: commonly
communicate: communication
school: schools
derive: derived, derives
old: older
dialect: dialects, dialectal
group: groups
islam: islamic
century: centuries
word: words
world: world's
europe: european
philosophy: philosophical
borrow: borrowing, borrowed, borrowings
influence: influenced
see: seen
particular: particularly
rule: rules
andalus: andalusi
early: earliest TABLE 10-continued The First Stage Output for English Language refer: refers
called: caller
consider: considered
varies: variety
written: unwritten
qur'an: qur'anic
follow: followed
norms: normal
national: nationality, nationalities
situation: situations
provides: provided
example: examples
separate: separately
case: cases
speak: speaking
country: countries
switch: switching
sentence: sentences
morocco: moroccan
respective: respectively
understand: understanding
part: parts
source: sources
direct: directly, indirectly
number: numbers
include: includes
sahara: saharan
iraq: iraqi
muslim: muslims
thamud: thamudic
kingdom: kingdoms
fih: fihi
algeria: algerian
tunisia: tunisian
libya: libyan
niger: nigeria
bahran: bahraini
hejaz: hejazi
yemen: yemen The Stemmer Evaluation Methodology A good stemmer (by definition) is a stemmer that stems all the words to their correct roots. In addition to minimizing storage requirements by reducing the number of redundant terms, stemming increases the matching probability for document comparison and unifies vocabulary. Unfortunately, stemming can cause errors known as over-stemming and under-stemming, or false-positive and false-negatives respectively.

Over-stemming and under-stemming are stemming errors that usually weaken the accuracy of stemming algorithms. Over-stemming is "taking off a true ending which results in the conflation of words of different meanings". Over-stemming occurs when two words with different stems are stemmed to the same root. For example, merging together the words "probe" and "probable" after stemming would constitute an over-stemming error.

Under-stemming is the failure to conflate morphologically related words. Under-stemming occurs when two words that should be stemmed to the same root are not. An example of under-stemming would be if the words "adhere" and "adhesion" are not stemmed to the same root.

An ideal stemmer is a stemmer with low under-stemming and over-stemming errors. The main problem is that both errors conflict with each other; reducing one type of error can lead to an increase of the other. Heavy stemmers reduce the under-stemming errors while increasing the over-stemming errors. Light-stemming reduces the over-stemming errors, but increases the under-stemming errors. Although light stemmers produce fewer errors than aggressive stemmers, aggressive stemmers reduce the size of the corpus significantly.

Different criteria are used to evaluate the performance of a stemmer. For text mining applications that deal with a massive number of documents, the ability to significantly reduce the size of the text is also a desirable property for a good stemmer. There are many other measures discussed in the literature to evaluate the performance of a stemmer including storage saving (compression), and retrieval effectiveness.

Three quantitative parameters have been introduced to evaluate English stemmer performance and efficiency: the under-stemming index (UI), the over-stemming index (OI), and the ratio between under-stemming errors and over-stemming errors known as the stemming weight (SW).

The proposed evaluation measure has been applied to other language stemmers such as those used with Portuguese, Dutch, and Spanish. However, the measure has never been applied to Arabic language stemmers.

Because reducing the vocabulary size is one of the main purposes of stemming, the ability to reduce the size of the corpus for indexing purposes is important. The Index Compression Factor (ICF) has been introduced as a strength measure to evaluate stemmers and compression performance. IC represents the fractional reduction (compression) in the index size.

Arabic stemmers have never been evaluated related to vocabulary compression strength or stemming weight. This chapter will apply the Paice evaluation measure and the ICF measure to our stemmer and two peer stemmers: Khoja and Light10.

Paice's Evaluation

Method Description

The Paice evaluation methodology starts by partitioning a sample of words (W) into concept groups containing morphologically and semantically related words. A perfect stemmer is able to conflate all words in the group to the same stem and that stem should not occur in any other group.

To generate the samples to test the stemmer, we had to generate different words from a single stem by adding suffixes, infixes, and prefixes. Contrary to English, in Arabic, adding affixes, prefixes, or suffixes to the word can change the meaning completely. Therefore, creating a group of morphologically and semantically related words is not a simple task. To achieve this, we first created the possible derivations of a single stem and then eliminated the word that did not belong semantically.

After creating the concept group, we computed the following for each group:

The Desired Merge Total (DMT), which is the number of different possible word form pairs in the particular group and is given by the formula:

DMT=0.5$n(n-1)$

Where n is the number of words in that group.

The Global Desired Merge (GDMT) is the sum of all the DMTs of the various samples.

There exists a case where certain words in a specific group can be conflated after stemming with words from another semantic group. To count all the possible word pairs formed, we used the Desired Non-merge Total (DNT):

DNT=0.5$n(W-n)$

The sum of the DNTs for all the groups was defined as the Global Desired Non-Merge Total (GDNT).

After the stemming process was performed, we wanted to see if all the words in a group were conflated in the same group. To quantify the stemmer's inability to merge these words, Paice introduced the "Unachieved Merge Total" (UMT):

$$UMT = 0.5 \sum_{i=1}^{s} u_i(n - u_i)$$

Where s is the number of distinct stems and $u_i$ is the number of instances that each stem occurs.

From the sum of UMT for each group (in our example 3 groups), we obtained the Global Unachieved Merge Total (GUMT).

The under-stemming index (UI) is: GUMT/GDMT

A stemmer might transform different words to the same stem (over-stemming). For such cases Paice introduced the Wrongly Merged Total (WMT), which is the count of over-stemming errors for each group.

$$WMT = 0.5 \sum_{i=1}^{t} v_i(n_s - v_i)$$

Where t is the number of original groups that share the same stem, $n_s$ is the number of instances of that stem and $v_i$ is the number of stems for group t.

Similar to the above, we can obtain the Global Wrongly Merged Total (GWMT) by summing the WMT for all the groups.

The over-stemming index (OI) is: GWMT/GDNT

The Three Stemmers Evaluation

Several groups of morphologically and semantically related words were submitted to each stemmer. If the stemmer produced more than one stem for the same group, then the stemmer had made an under-stemming error (UI). If words belonging to different groups were stemmed to the same stem, then the stemmer had made an over-stemming error (OI).

The ideal stemmer should be able to conflate (group) the related words to the same stem and have a low UI and OI.

We used the equations described in the previous section to quantify both stemming errors. We used the following sample of words divided into the five concept groups shown in Table 11.

TABLE 11

List of concept groups with DMT and DNT calculations

| | Word | Concept Groups | DMT | DNT |
|---|---|---|---|---|
| 1 | طفل (child) | أطفال , الطفله , أطفالهم ,الأطفال | 6 | 48 |
| 2 | طفيل (parasite) | وطفيليات , طفيلي , طفيليات , الطفيليات | 6 | 48 |
| 3 | خرج (go out) | خرجوا , خرجت , خرجن ,يخرجن | 6 | 48 |
| 4 | خريج (graduate) | خريجات , خريجين , خريجي , الخريجين | 6 | 48 |
| 5 | فيتامين (vitamin) | فيتامينات , الفيتامين , الفيتامينات , وفيتامين | 6 | 48 |
| 6 | مكتبه (library) | المكتبه , مكتبات , ومكتبه , ومكتبات | 6 | 48 |
| 7 | مكتب (office) | ومكتب , المكتب , المكتب , مكتب | 6 | 48 |
| Total | | | 42 | 336 |

We submitted the same sample to the three stemmers in order to evaluate their performance by calculating OI, UI, and SW.

As shown in Table 12 the Light10 stemmer succeeded in conflating words in only groups four and six resulting in under-stemming errors. GUMT was 21, while the UI was 0.5.

We also noticed that a word in group seven was conflated to a group six stem, causing an over-stemming error. After rearranging the groups, we calculated the GWMT to be 10, while the OI was 0.03. The SW was 0.06.

TABLE 12

List of words after processing by the light10 stemmer

| | UMT | Stem | Concept Groups |
|---|---|---|---|
| 1 | 5 | طفل | أطفال , طفل , أطفالهم , اطفال |
| 2 | 3 | طفيل | طفيلي , طفيلي , طفيل , طفيلي |
| 3 | 6 | خرج | خرجوا , خرجت , خرج , يخرجن |
| 4 | 0 | خريج | خريج , خريج , خريج , خريج |
| 5 | 4 | فيتامين | فيتام , فيتامين , فيتامين , انتام |
| 6 | 0 | مكتبه | مكتب , مكتب , مكتب , مكتب |
| 7 | 3 | مكتب | مكتب , مكاتب , مكتب , مكتب |

The Khoja stemmer made both under-stemming and over-stemming mistakes. The words in groups five and six were not conflated to the same stem (under-stemming) causing a GUMT of 8 and a UI of 0.190. Words in groups three and four were stemmed to the same root (over-stemming), words in groups one and two were stemmed to the same root, and words in group six and a word in group seven were stemmed to the same root. GUMT, in this case, was 42 with 0.125 OI. The Khoja stemming weight was approximately 1.832. The Khoja results are shown in Table 13.

TABLE 13

List of stemmed words by the Khoja stemmer

| | UMT | Stem | Concept Groups |
|---|---|---|---|
| 1 | 0 | طفل | طفل , طفل , طفل , طفل |
| 2 | 0 | طفيل | طفيل , طفيل , طفيل , طفيل |
| 3 | 0 | خرج | خرج , خرج , خرج , خرج |
| 4 | 0 | خريج | خريج , خريج , خريج , خريج |
| 5 | 4 | فيتامين | فيتامينات , فيتامينات , بتم , يتم |
| 6 | 4 | مكتبه | كبي , كبي , كتب , كتب |
| 7 | 0 | مكتب | كتب , كتب , كتب , كتب |

For the ETS stemmer, all the words were successfully stemmed to the same root with no under-stemming resulting in a GUMT and a UI of 0 (shown in Table 14). The merging of groups six and seven resulted in a GWMT of 16 and an OI of 0.048.

TABLE 14

List of words after ETS stemming

| | UMT | Stem | Concept Groups |
|---|---|---|---|
| 1 | 0 | طفل | طفل , طفل , طفل , طفل |
| 2 | 0 | طفيل | طفيل , طفيل , طفيل , طفيل |
| 3 | 0 | خرج | خرج , خرج , خرج , خرج |
| 4 | 0 | خريج | خريج , خريج , خريج , خريج |
| 5 | 0 | فيتامين | فيتامين , فيتامين , فيتامين , فيتامين |
| 6 | 0 | مكتب | مكتب , مكتب , مكتب , مكتب |
| 7 | 0 | مكتب | مكتب , مكتب , مكتب , مكتب |

The reason for the undesired merging was that we decided to include the "ة" ta'a marboota in the suffixes list, which caused the word "مكتبه" and the word "office" "مكتب" to conflate to the same root. The "ة" ta'a marboota is usually used in Arabic to represent the feminine form of a noun. For example, a female teacher is represented in Arabic by adding "ة" ta'a marboota to the masculine form of the word.

Unfortunately, in other cases such as the discussed case, the addition of the "ة" ta'a can change the meaning of the word.

Thus, if we removed the "ة" ta'a marboota from our suffixes list, we would lose the ability to conflate the feminine and masculine forms of the word.

Although the documented testing sample is very small, we iteratively tested various samples while designing our stemmer and found that some of the prefixes included in the methodology can create over-stemming errors and not including them can cause under-stemming errors. This is due to the unvowelized representation of the MSA language causing homonyms to be conflated together. This is not a special case related to the Arabic language and is not treated in our model neither in any available Arabic stemmer.

Another sample of 419 words was selected and divided into 81 conceptual groups (see appendix C). The results are shown in Table 15. The rate of both under-stemming and over-stemming for our stemmer was lower than Khoja and Light10. Our proposed stemmer was able to achieve the task of reducing both under and over stemming errors and thus, we can conclude that our stemmer is the most effective of the three stemmers.

TABLE 15

Results of Paice's Method

| | OI | UI | SW |
|---|---|---|---|
| ETS | $0.101 \times 10^{-4}$ | 0.294 | $0.344 \times 10^{-4}$ |
| Khoja | $0.5 \times 10^{-4}$ | 0.292 | $1.71 \times 10^{-4}$ |
| Light | $0.15 \times 10^{-4}$ | 0.483 | $0.311 \times 10^{-4}$ |

Vocabulary Reduction

The ICF has been introduced as a strength measure to evaluate stemmers. IC represents the fractional reduction (compression) in the index size.

$$ICF = \frac{(n-s)}{n}$$

Where:
  n=Number of unique words in the dataset before stemming
  s=Number of unique stems in the dataset; the greater the ICF, the stronger the index.

The evaluation of Arabic stemmers has focused only on information retrieval (IR) as an evaluation measure. There is no available benchmark data in the literary domain that evaluates Arabic stemmers using the compression factor.

Figure 10:
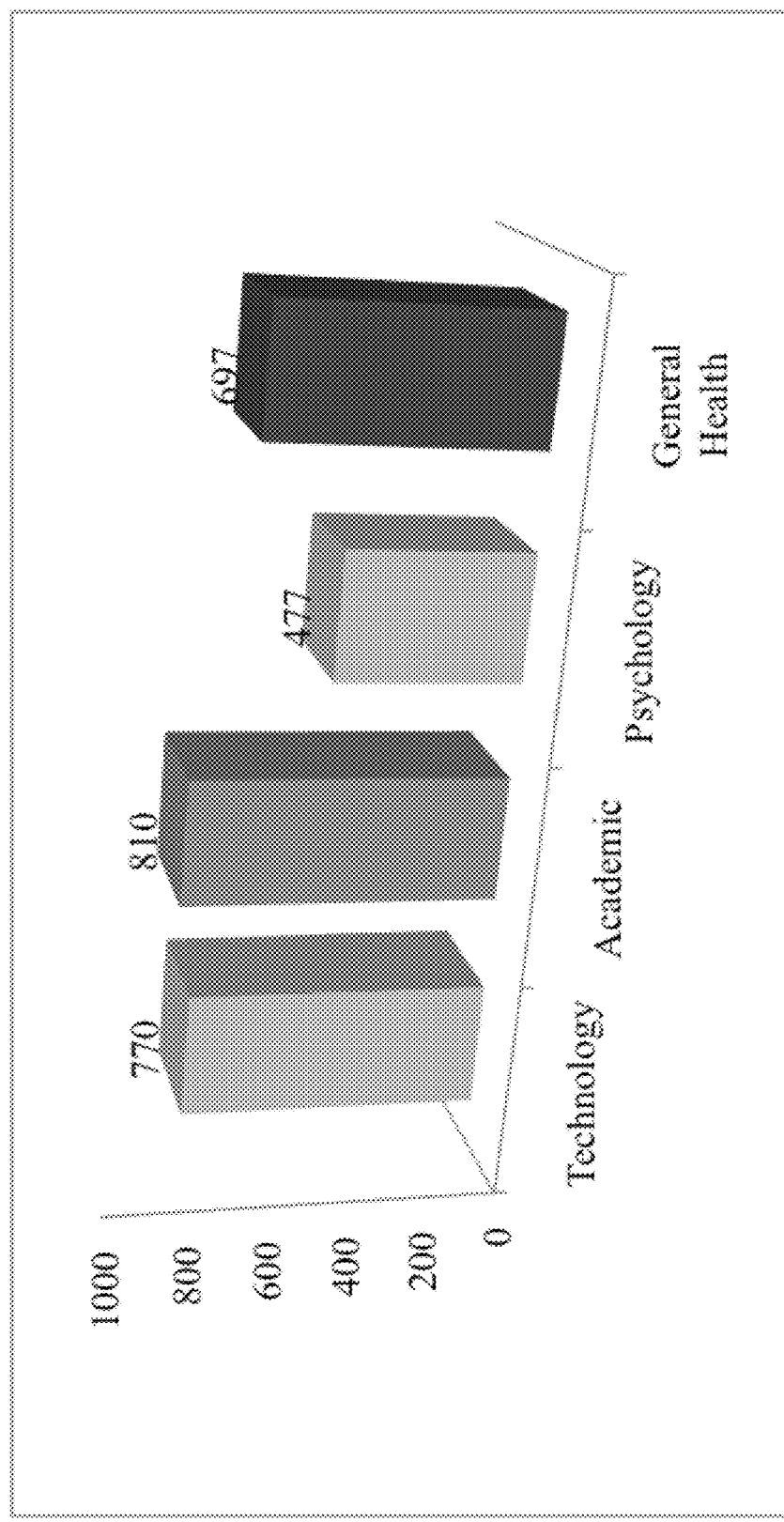
FIG. 10 is a graph of a dataset of documents divided by category.
Figure 11:
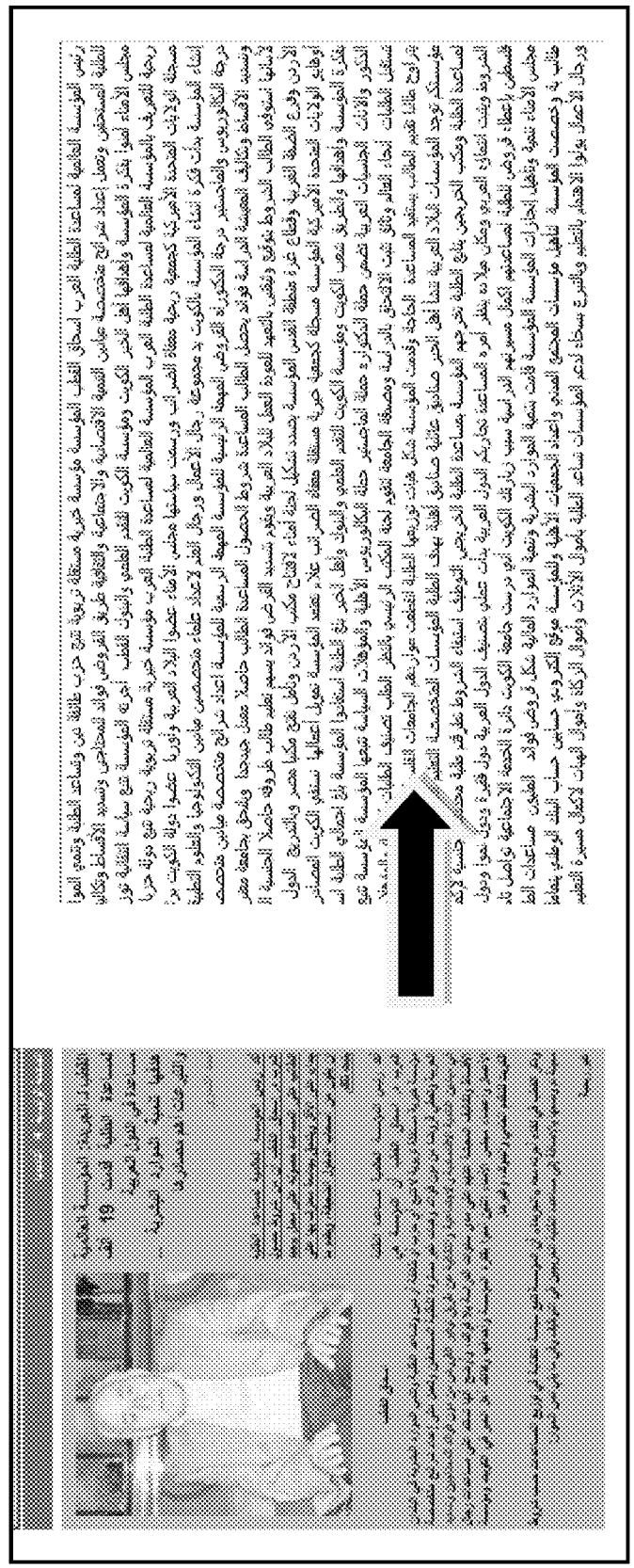
FIG. 11 is an exemplary input document.

We chose to build our own corpus by collecting online documents from Arabic newspapers and specialized websites. The data used in this study is based on modern standard Arabic (MSA). Our experiments were conducted on 2,754 documents that contain 410,030 words (shown in Table 16). The documents were collected from online newspapers and specialized Arabic medical websites. The dataset is divided into four groups (as shown in FIG. 10). The documents in each dataset were preprocessed by converting them to Unicode (Shown in FIG. 11) and eliminating stop words (based on a stop words list included in Appendix A).

The first dataset is the academic dataset consisting of 810 Arabic academic news articles of various lengths collected from a Kuwaiti daily online newspaper (http://alraimedia.com/Alrai/). The dataset dictionary size was 21,253 words, which was reduced to 20,926 words after eliminating the stop words.

TABLE 16

Original Data Description

| | Vocabulary Size | Number of words | Number of Documents | average # of words/document |
|---|---|---|---|---|
| Psychology | 14,987 | 76,667 | 477 | 161 |
| Technology | 14,383 | 89,215 | 770 | 116 |
| Academic | 21,253 | 92,876 | 810 | 115 |
| General Health | 30,703 | 157,272 | 697 | 226 |
| Total | 81,326 | 410,030 | 2,754 | 149 |

The second dataset is the technology dataset, which consists of technology articles collected from the Kuwaiti newspaper: (http://alraimedia.com/Alrai/). The dataset originally had a dictionary size of 14,383 words, but was reduced to 14,170 words after the stop word removal process.

The third dataset consists of 477 articles on psychological issues. The dataset originally had a dictionary size of 14,987 words, but was reduced to 14,425 words after the stop word removal process. The dataset was collected from a medical website (http://www.multikulti.org.uk/ar/health/).

The last dataset was the general health dataset consisting of 698 documents. The original dictionary size of the dataset was 30,703 words, which we reduced to 30,029 words. The health dataset was collected from the sehha website (http://www.sehha.com/). The overall dictionary size of the corpus was 79,743 words.

Only words of size three or more were allowed, thus a filter of three letters was applied. The final vocabulary size was 77,755 words. (shown in Table 18)

After creating our corpus, three separate datasets were created by applying our ETS stemming technique, the Khoja stemmer, and the Light10 stemmer respectively, for evaluation purposes.

We calculated the ICF for all three stemmers. Figure and Table 5-8 show each stemmer's compression strength in each category.

FIG. 5-4 shows the average ICF for each stemmer and shows that the ETS stemmer outperformed the light10 stemmer but achieved a lower ICF than the Khoja stemmer with a 0.63 average ICF.

TABLE 17

Dataset Description After Stop-words Removal

| | Vocabulary Size | NO. of words | NO. of Documents | average # of words/document |
|---|---|---|---|---|
| Psychology | 14,425 | 56,358 | 477 | 118 |
| Technology | 14,170 | 86,492 | 770 | 112 |
| Academic | 20,926 | 90,700 | 810 | 112 |
| General Health | 30,029 | 150,864 | 697 | 216.5 |
| Total | 79,550 | 384,414 | 2,754 | 139.5 |

TABLE 18

Corpus characteristics after applying a token filter of 3

| | Original | Light10 | Khoja | ETS |
|---|---|---|---|---|
| Psychology | 13,861 | 9,718 | 2,871 | 5,602 |
| Technology | 13,939 | 9,372 | 2,743 | 5,233 |
| Academic | 20,621 | 13,653 | 3,096 | 8,172 |
| General Health | 29,334 | 19,018 | 5,080 | 11,875 |
| Total #of words | 77,755 | 51,761 | 13,790 | 30,882 |

Figure 12:
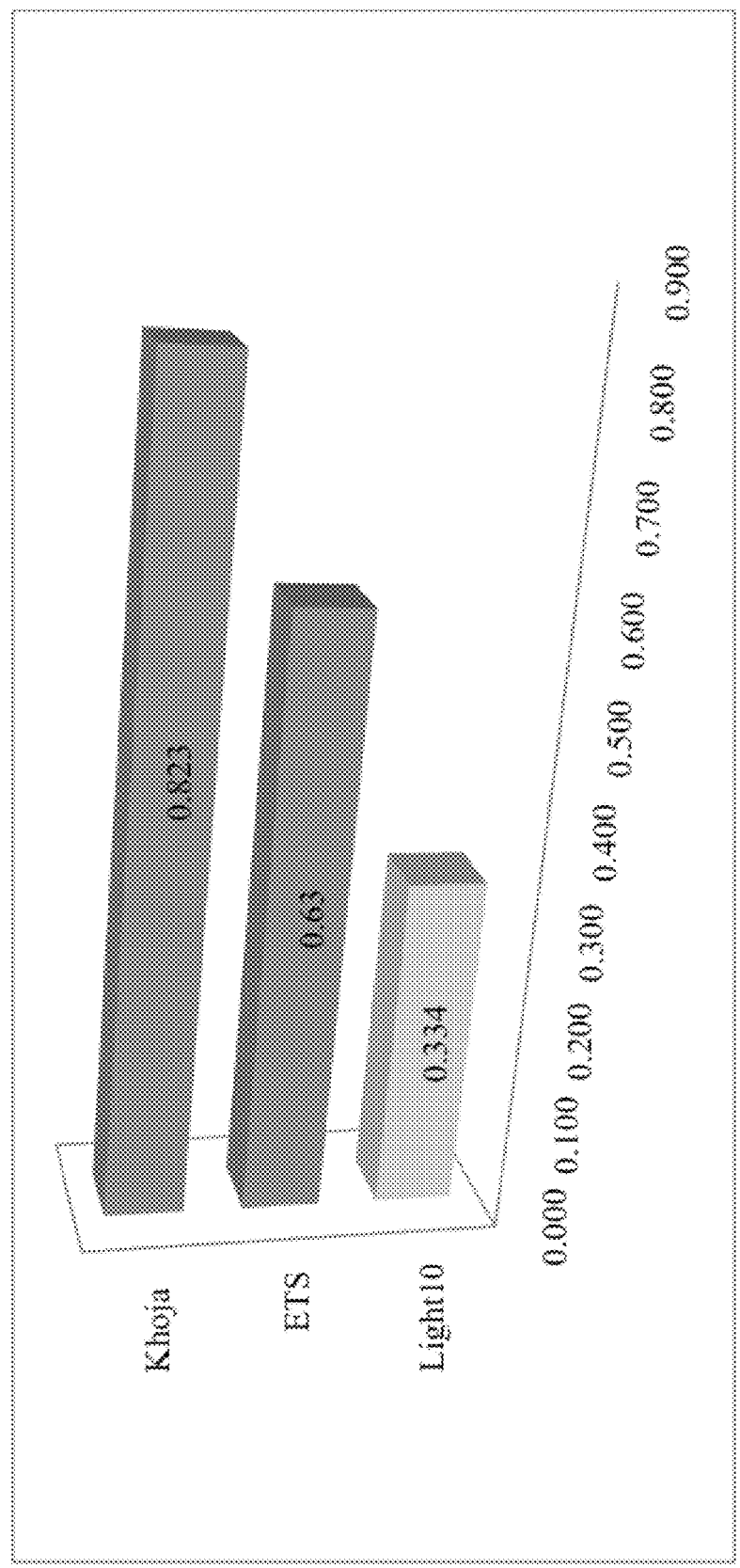
FIG. 12 is a graph of average index compression factor for stemmers.

FIG. 12 depicts a graph of average index compression factor for stemmers.

A stemmer according to at least one embodiment was evaluated using two different methodologies.

The stemmer's performance with both the Khoja and the Light10 stemming algorithms using stemming weight differences and compression strength differences as evaluation criteria.

The stemmer outperformed both the Khoja root-based stemmer and the Light10 by reducing both the over and the under stemming weight.

Over-stemming and under-stemming are the main drawbacks of root-based stemming and the light stemming algorithms. The Khoja stemmer (root-based) tends to stem morphologically related words (but not necessarily semantically related words) and as a result, has a high over-stemming error rate. Additionally, when dealing with nouns, the Khoja stemmer fails to conflate the words in the same conceptual group causing a high under-stemming error.

On the other hand, Arabic light stemmers do not deal with infixes and only remove frequent suffixes and prefixes from the words leading to a high under-stemming error rate.

In addition to having a high over-stemming Index, the Khoja stemmer also had the highest compression index. In contrast, the high under-stemming error rate associated with the light stemmer results in a lower compression index because of its failure to conflate semantically and syntactically related words.

Our ETS stemmer achieves a higher compression rate than the light stemmer but a lower compression rate than the Khoja stemmer without increasing the stemming errors.

The stemming errors caused by our stemmer were caused by the choice not to integrate patterns that deal with infixes, except for the ones that deal with plurals. Our choice was based on the nature of the language because patterns and their roots are not always semantically related.

In the next chapters, we evaluate the effectiveness of the three stemmers on text mining and IR tasks in an attempt to measure our stemmer contributions to these two tasks.

Figure 13:
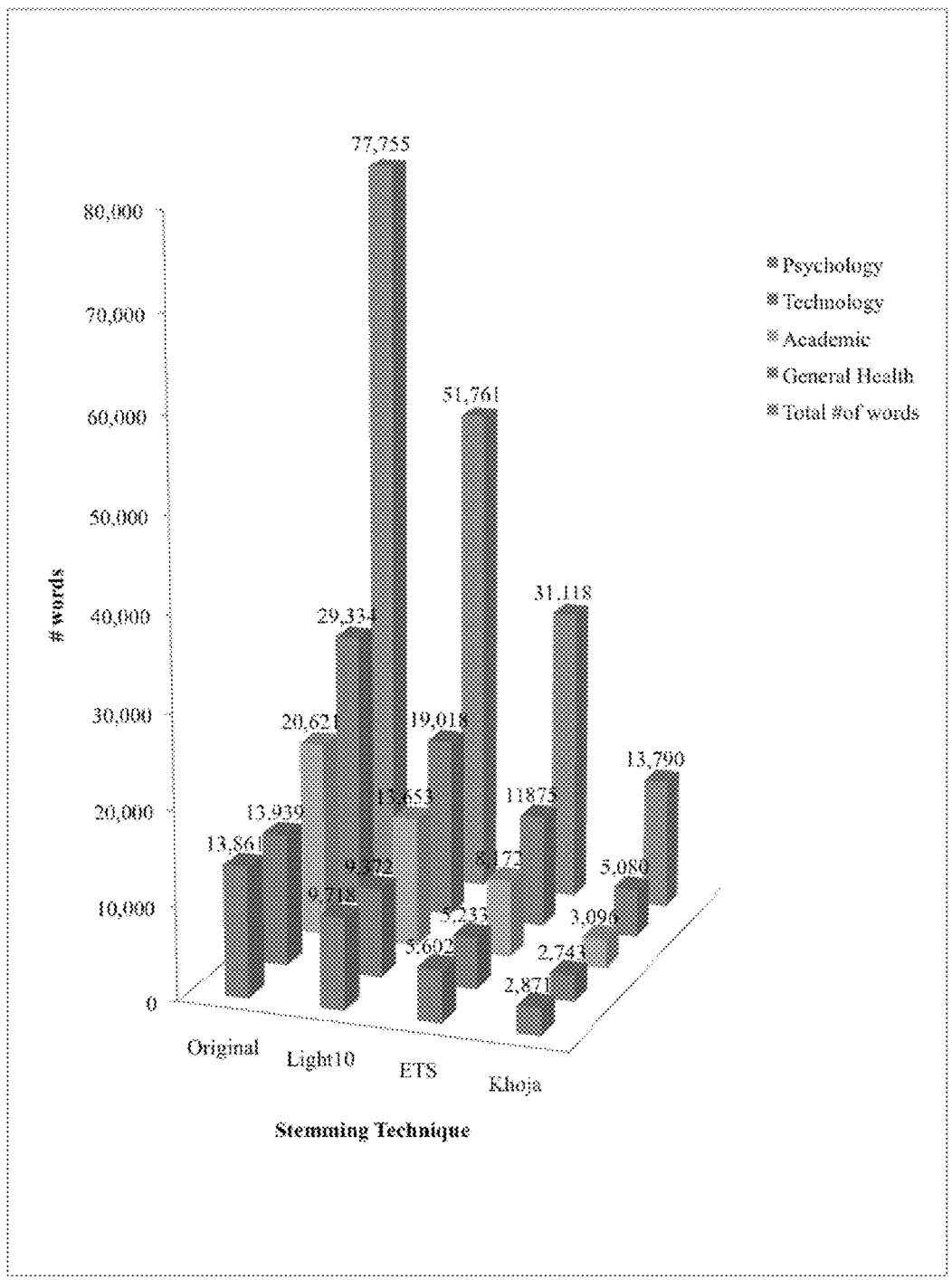
FIG. 13 is a graph of corpus characteristics comparison.

FIG. 13 depicts Corpus characteristics comparison.

Stemming Algorithm Effect on Improving Text Mining

Introduction

Text mining, also known as text data mining, is the process of extracting interesting and unknown information from structured and unstructured text documents, while with Information Retrieval (IR) and web searches, the user looks for something that is already known.

Text mining is becoming a vital tool to enhance both IR and web searches, especially with the massive increase in the number of digital documents. For example, text mining can be used to visualize search results or to categorize web pages by topic as seen in Yahoo searches.

Document clustering and categorization are both text mining tools. Document categorization (classification) is an example of supervised learning. It is the process of automatically classifying unlabeled documents into a predefined category based on their content.

Cluster analysis is the process of dividing objects into groups of similar objects according to a distance measure. Clustering is applied in many fields including text mining, natural language processing, and machine learning. Document clustering is an example of unsupervised learning and involves automatically grouping unlabeled documents into an unknown number of categories based on their content. Document clustering is a significant tool to improve the precision and recall of a text processing system. Document clustering assists analysts by providing an inclusive overview of the huge amount of information contained in a large collection of documents. Furthermore, clustering algorithms can be used in many different fields.

Lately, research in Arabic text mining has increased due to the large amount of Arabic online data, such as news articles, blogs, and e-mail messages. The data increase causes a major problem for document mining due to the high dimensionality (i.e. size of the vocabulary) of the feature space. Thus, a feature selection technique is necessary to address the dimensionality issue.

This chapter investigates the effect of stemming, in general, as a feature selection criterion for improving Arabic text mining. Three stemming techniques: root-based stemming, ETS stemming, and light stemming were employed and assessed in text classification and clustering exercises for an Arabic corpus to compare and contrast the effect of these Arabic stemming algorithms on improving text mining.

The experiments were conducted on a corpus consisting of 2,775 Arabic documents that fall into four categories: Technology, academic, general health, and psychology.

Among the two clustering techniques known as k-means and sequential information bottleneck (SIB), which classifier is more suitable to cluster Arabic documents?

This chapter is organized as follows. Section 2 briefly describes related work in the area of Arabic text mining. Section 3 describes the dataset used in our experiments and the preprocessing performed specific to the Arabic language. Section 4 outlines the experimental setting, as well as the experiments carried out to evaluate the performance of the various classifiers. In Section 5, clustering experiments are discussed and the effect of stemming is investigated. Finally, in section 6 we conclude the chapter by summarizing our findings.

Contrary to studies on Arabic classification, clustering Arabic documentation has not been investigated except in the field of improving IR. To our knowledge, there are no published studies on improving Arabic text clustering.

It is hard to generalize all the previous studies in the Arabic text mining field due to the lack of an Arabic classification or clustering benchmark.

Evaluation Measures

Various measures exist to determine the performance of a text classification system. The measure I will be using is the classification accuracy. Accuracy is the "extent to which the actual classifications of test takers agree with those that would be made on the basis of their true scores". In other words, accuracy represents the percentage of predictions that are correct. To explain this measure, I would like to introduce the confusion matrix shown in Table 19.

TABLE 19

The Confusion Matrix

| | True Class | |
|---|---|---|
| | Positive | Negative |
| Predicted Positive | a (True Positive) | b (False Positive) |
| Predicted Negative | c (False Negative) | d (True Negative) |

Where:
 a is the number of correctly classified positive documents,
 b is the number of incorrectly classified positive documents,
 c is the number of incorrectly classified negative documents,
 and d is the number of correctly classified negative documents.
The formula for Accuracy is:

$$\text{Accuracy} = \frac{(a+d)}{a+b+c+d}$$

In addition to validating classification results, we also chose to use the confusion matrix to externally validate clustering methods and use the accuracy measure since the ground truth was already known.

Document Classification

Experimental Settings

Three learning methods were used throughout our experiments: Naïve Bayes (NB), Support Vector Machines (SVM), and K Nearest Neighbor (KNN).

In all our experiments, we used repeated 10 folds stratified (folds contain approximately the same proportion of labels as the original dataset) and cross-validation. The classification results were averaged over all splits. In cross validation, a fixed number of documents is reserved for testing (as if they were unlabeled documents) and the remainder are used for training (as labeled documents). Several such partitions of the data set were constructed, by making random splits of the dataset.

We ran two different experiments: a four-class classification problem (technical, academic, psychology and general health) and a binary-class classification problem (psychology versus general health).

For the four-class experiment, the original size of the dictionary was 77,755 words, while the dictionary size of the binary-class experiment was 43,195 words. The two experiments were carried out using four different representations of the same corpus. The first version used the original dataset with stop words removed and represented a baseline. The second representation used Light10 stem-vectors as representatives of documents. The third used the Khoja root vector as representative of the documents. The last representation used our algorithm vector. These four representations were assessed in terms of accuracy.

The weight of each word (term) was calculated using the bag-of-words approach, also known as the Term Frequency-Inverse Document Frequency (TFIDF), where each document is represented with a vector of the word counts (not ordered) for the words that appear in it. The term, "frequency," represents the number of unique terms in a document ("d") and the document frequency is the number of documents in which a term ("t") appears. The bag-of-words vector was normalized so that rare words were more important than common words.

The experiments were carried out using the Java-based tool, Rapidminer. The tool includes libraries imported from the Weka tool.

Classification Algorithms

K Nearest Neighbor

The K Nearest Neighbor algorithm is a classifying (supervised learning) algorithm where the new object class is predicted based on the majority voting of the nearest neighbors. The algorithm is one of the simplest classifying algorithms since it does not use any model and depends mainly on memory. The algorithm partitions the data into training and testing data, preserves the class of the training sample, and uses it to predict the class of the new objects in the testing sample.

When using the word "nearest," we mean objects having a strong relationship among them. The strength of the relationship is quantified and the literature often refers to this as the "Similarity Metric." There are different similarity metrics that can be used to find the nearest neighbors. We used the cosine similarity as the document similarity metric. Text-based similarities are usually calculated as the cosine angle between the tf-idf vectors of two documents.

As cosine similarity quantifies the distances between the new object and all the training set objects, only K training objects (in our case, three) having the minimum distances were picked to be part of the voting process.

The number of neighbors included in the voting process was represented by a number ("K"). Prior to designing our experiments, we conducted various experiments with K=3, 5, 7, 9, 13, 15, 17, and 20 to chose the K value.

Figure 16:
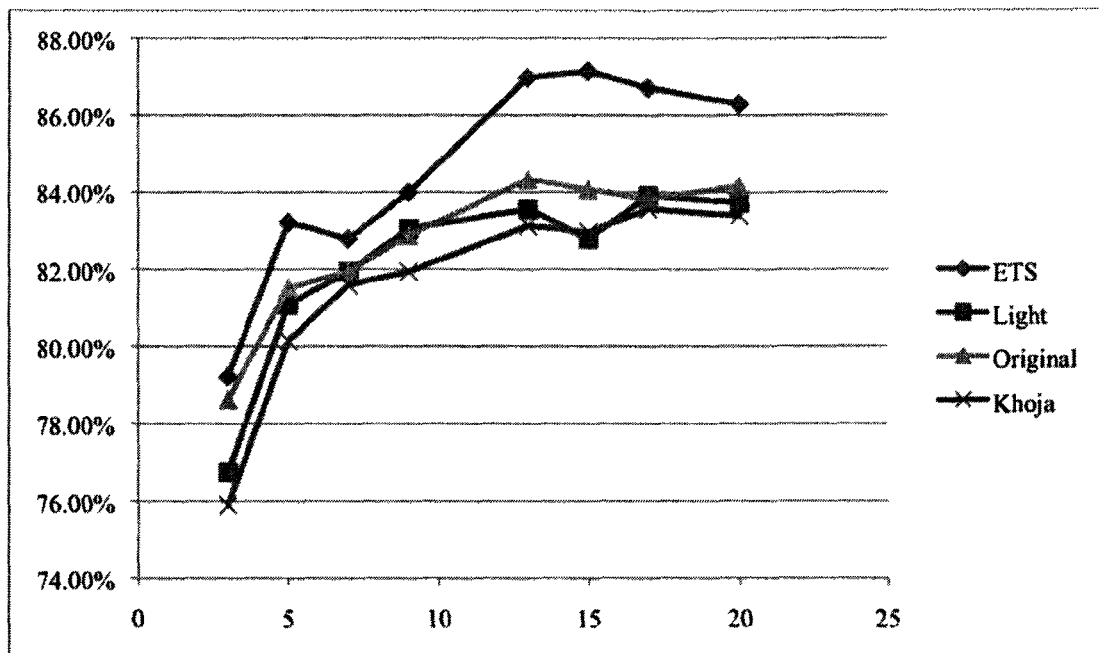
FIG. 16 is a graph of classification accuracy for a binary dataset.

Table 20 and FIG. 16 shows the accuracy of the KNN algorithm for binary-class classification with various values of K. We chose K=13, to assure the best performance for all the indexing techniques.

Figure 17:
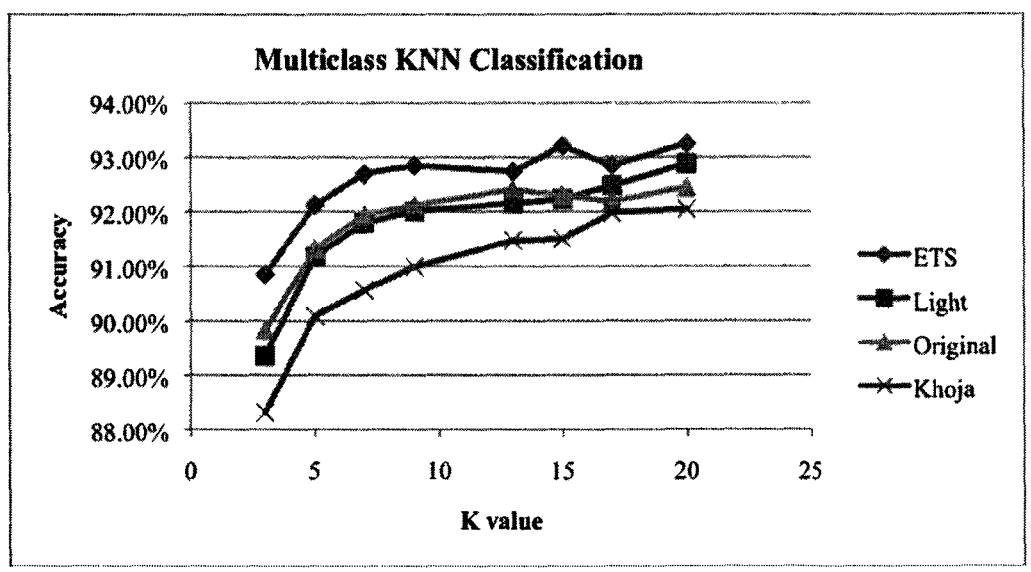
FIG. 17 is a graph of classification accuracy for a muliti-class dataset.
Figure 18:
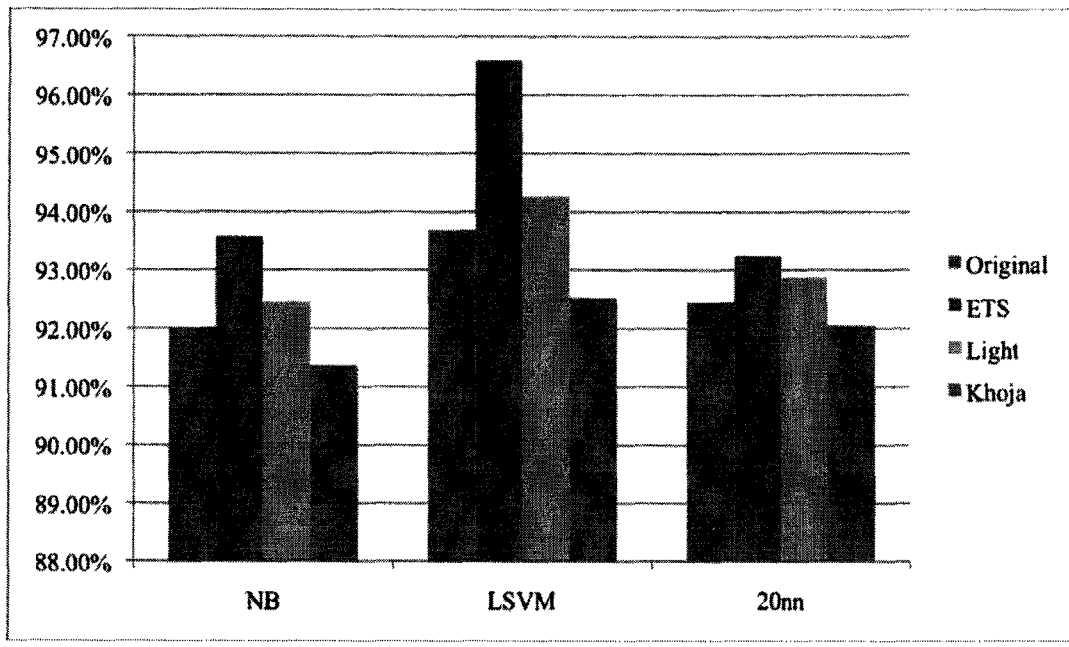
FIG. 18 is a graph of accuracy of multiclass classification experiments.
Figure 19:
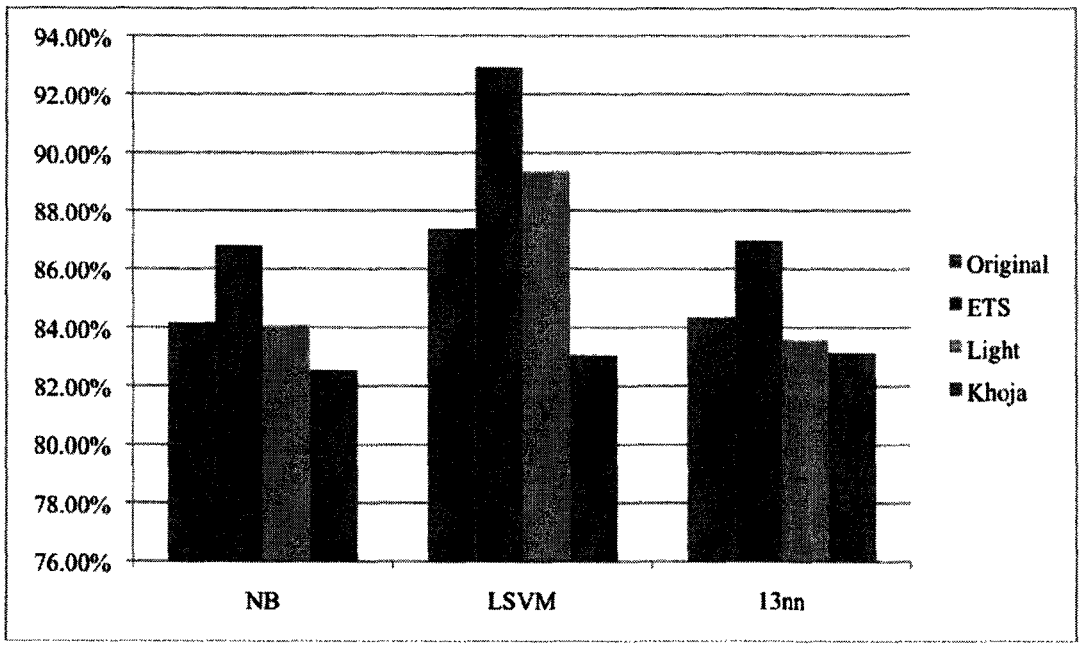
FIG. 19 is a graph of accuracy of binary classification experiments.

On the other hand, for multi-class classification K=20 (shown in Table 21 and FIG. 17) achieved the highest accuracy values for all the indexing techniques.

The time complexity of KNN algorithm is O(KT), where T is the number of all the training samples.

TABLE 20

KNN Binary Classification Accuracy

|  | Original | ETS | Light | Khoja |
| --- | --- | --- | --- | --- |
| 3nn | 78.62% | 79.22% | 76.75% | 75.89% |
| 5nn | 81.52% | 83.22% | 81.09% | 80.15% |
| 7nn | 81.94% | 82.79% | 81.94% | 81.60% |
| 9nn | 82.88% | 83.99% | 83.05% | 81.94% |
| 13nn | 84.33% | 86.97% | 83.56% | 83.13% |
| 15nn | 84.07% | 87.14% | 82.79% | 82.96% |
| 17nn | 83.82% | 86.71% | 83.90% | 83.56% |
| 20nn | 84.16% | 86.29% | 83.73% | 83.39% |

TABLE 21

The Accuracy among Multiclass Classification Experiments

|  | Original | ETS | Light | Khoja |
| --- | --- | --- | --- | --- |
| 3nn | 89.83% | 90.85% | 89.36% | 88.31% |
| 5nn | 91.32% | 92.12% | 91.18% | 90.09% |
| 7nn | 91.94% | 92.70% | 91.79% | 90.56% |
| 9nn | 92.12% | 92.85% | 92.01% | 90.99% |
| 13nn | 92.41% | 92.74% | 92.16% | 91.47% |
| 15nn | 92.30% | 93.21% | 92.23% | 91.50% |
| 17nn | 92.19% | 92.85% | 92.48% | 91.98% |
| 20nn | 92.45% | 93.25% | 92.88% | 92.05% |

Naïve Bayes

Naïve Bayes is a statistical linear machine learning algorithm based on conditional probabilities (posteriori) with the assumption that all features are unrelated and independent. Because independent variables are assumed, only the variances of the variables for each class need to be determined and not the entire covariance matrix.

For document classification tasks, the NB algorithm has a training time: O(|D|Ld) and a test time O(|C|Lt) where Ld is the average length of a training document, Lt is the average length of a test document, D is a document represented as a set of finite terms (D={w1, w2, . . . , w3}), and C is the number of target classes.

Despite its simplicity, the NB algorithm often outperforms more sophisticated classification methods. The algorithm offers fast, highly scalable model building and scoring. Before applying the algorithm, the objects to be classified need to be represented by numerical features. The NB algorithm can be used for both binary and multiclass classification problems.

An advantage of the NB classifier is that it requires a small amount of training data to estimate the parameters (means and variances of the variables) necessary for classification.

The training set containing labeled documents is used to compute the a posteriori probabilities for the classes (categories). The a posteriori probability is calculated for each class using the equation below:

$$P(Ci \mid D) = \frac{P(Ci) * P(D \mid Ci)}{P(D)}, i = 1, 2, \ldots C$$

The algorithm assumes that the occurrence of each word is independent of the occurrence of other words in the document and that the order of the words in a document does not affect the classification of the document.

The learned knowledge is used to classify new unlabeled documents. D is assigned to the class C with the largest a posteriori probability.

$$P(Ci|D) > P(Cj|D)\ 1 \leq j \leq, j \neq i$$

Since P(D) is constant for all classes, only $P(C_1)*P(D|C_i)$ need to be maximized, where $P(C_1)=P(C_2)=P(C_3)=\ldots P(C_c)$ $P(C_i)$ can be estimated by calculating $$P(C_i) = \frac{s_i}{s}$$

where s is the total number of training samples and si is the number of training samples of class $C_i$.

Support Vector Machines

The main idea of support vector machines (SVMs), also known as maximum margin classifiers, is to classify by finding an optimal hyper plane to separates two classes with the maximum-margin that maximizes the minimum distance between the hyper plane and the training points. SVM classifier input can be linearly, or non-linearly separable.

The experiments were held using the LIBSVM Library implemented in the open source software Rapidminer. The LIBSVM learner was created by Chih-Chung Chang and Chih-Jen Lin and can be a method for addressing classification and regression problems. It can solve problems such as C-SVM classification, nu-SVM classification, one-class-SVM, epsilon-SVM regression, and nu-SVM regression. The tool also allows the user to pick among several kernel types: Linear, Poly, RBF, Sigmoid, and Epnechnikov.

For our experiments we chose to use C-SVM Linear classification due to the fact that most text categorization problems are linearly separable with increasing the C value (cost of constraints violation) to 30.

Document Clustering

Experimental Settings

In this set of experiments, we observed the stemmer effects on improving the document clustering performance in comparison to the Khoja and Light10 stemmers using two clustering algorithms throughout our experiments: K-means clustering, and sequential bottleneck.

We ran two different experiments. For the first experiment, we performed a four-class clustering experiment (technical, academic, psychology and general health). With the second experiment, our goal was to study the effect on highly relevant documents. Thus, we chose two medical subsets: Psychology versus general health.

For the four-class experiment, the original size of the dictionary was 77,755 words, while the dictionary size of the binary-class experiment was 43,195 words. The two experiments were carried out using four different representations of the same corpus. The first version used the original dataset with stop words removed and represented a baseline. The second representation used Light10 stem-vectors as representatives of documents. The third used the Khoja root vector as representatives of documents. The last representation used our algorithm vector. These four representations were assessed in terms of accuracy.

Clustering Algorithms

Clustering algorithms are either hierarchical or partitional. Hierarchical clustering starts with the assumption that each document is a unique cluster and then iteratively merges similar clusters. The merging is based on calculating the distance between each pair of documents to construct a proximity matrix. The proximity matrix is then used to find the most similar pairs of documents and to merge them into a cluster. This process stops when all patterns have been combined into a single cluster. Although hierarchical methods are practical and can be used for many different types of data with no algorithm modification, hierarchical clustering is computationally expensive for large data.

Partitional clustering starts with either a random number of clusters or a pre-defined number of clusters. A validity measure is iteratively applied to optimize the number of clusters.

In our experiments, we chose to compare two clustering algorithms: K-means clustering and the sequential information bottleneck algorithm (SIB).

K-Means Clustering

K-means clustering is a widely used partitional clustering method with a linear time complexity. K-means clustering starts with a random number of clusters and then reassigns each document to the closest cluster center. After this step, the cluster centers are recalculated. This process will usually be repeated until no documents are reassigned in a stage or until a predefined error measure is reached.

Partitional clustering techniques are efficient, easy to implement, and less computationally expensive. For example, K-means clustering algorithm runs in O(n) where n is the number of documents.

The compulsory initialization for the algorithm, which involves choosing the number of clusters, is considered a drawback for the algorithm. Based on this initialization, the final results vary each time one runs the algorithm. Thus, it is advised to run the algorithm several times with different number of clusters to choose the best clustering.

SIB Clustering

The sequential information bottleneck algorithm (sIB) is a probabilistic supervised clustering algorithm. The algorithm starts by grouping words into clusters. Then, documents are projected onto the pseudo-words (centroid).

Starting with one cluster, the algorithm iteratively splits the clusters by creating a new centroid $\hat{w}$ at a random distance from the original centroid and re-distributes the points using the following equation:

The parameter $\beta$ (annealing parameter) starts very small and increases with every iteration. The sIB algorithm stops as the number of clusters is stabilized.

The algorithm has proven to be very efficient in document clustering (Tishby) with a time complexity of $O(,n2.)$ where n is the number of items to be clustered.

Experimental Results

To compare the performance of the classification and clustering algorithms using the four different indexing measures, the accuracy values were computed. These values are shown in Table 6-4, Table 6-5, Table 6-6, and Table 6-7.

22 displays the average accuracy computed over 10 runs of each multi-class classification experiment. Accuracy is calculated according to the confusion matrices based on the ground truth labels. Based on these results, we can make some observations.

The best result was the ETS indexing according to the Linear SVM classification with an accuracy of 92.93% and 96.59% for binary and multiclass classification respectively. The Khoja indexing approach produced the worst result of 82.54% (with the binary NB classifier) and of 91.36% with multiclass NB classification.

The results show higher performance for the Linear SVM classifier over the NB and KNN classifiers for both classification experiments (i.e. binary class and four-class). For English document categorization, the SVM algorithm has been reported to produce the best results. Likewise, for Arabic, the performance of KNN and SVM classifiers has been performed and SVM has been determined to be more suitable in categorizing Arabic documents.

TABLE 22

The Accuracy among the Multiclass Classification Experiments

|      | Original | ETS    | Light  | Khoja  |
|------|----------|--------|--------|--------|
| NB   | 92.01%   | 93.57% | 92.45% | 91.36% |
| LSVM | 93.68%   | 96.59% | 94.26% | 92.52% |
| 20nn | 92.45%   | 93.25% | 92.88% | 92.05% |

SVM algorithm superiority is due to the fact that it can handle a large number of features due to the algorithm's usage of over fitting protection, which insures robustness regardless of the number of features [94].

Stem indexing outperformed root indexing. Our experiment results align with the results of Duwairi et al. [70] regarding the effect of root-based indexing and light stemming on Arabic text. Duwairi et al. [70] concluded that light stemming is a better feature selection approach due to over-stemming errors caused by root-based indexing.

By comparing the classification performance after using the Khoja stemmer to that without stemming, we noticed a performance reduction, especially in the case of the Linear SVM. The Khoja stemmer's over-stemming errors involved the merging of semantically unrelated words. Thus, all three classifiers were given misleading features which explains the performance reduction.

TABLE 23

The Accuracy among all Binary Classification Experiments

|  | Original | ETS | Light | Khoja |
|---|---|---|---|---|
| NB | 84.16% | 86.8% | 84.07% | 82.54% |
| LSVM | 87.39% | 92.93% | 89.35% | 83.05% |
| 13nn | 84.33% | 86.97% | 83.56% | 83.13% |

The light stemmer's failure to merge related words due to its under-stemming errors did not decrease the categorization accuracy, but, increased the accuracy. The light stemmer is able to reduce the dataset dimensionality. This advantage makes light stemming a recommended feature reduction technique for Arabic documents categorization when compared to the Khoja stemmer, although it reduced the size of the dataset only by approximately 30%.

The reduction of both under-stemming errors and over-stemming errors made our stemmer a better feature reduction technique, where we were able to both reduce the vocabulary size of the dataset by (60%) and improve the categorization accuracy.

To sum up, features reduction significantly affects Arabic documents and LSVM outperformed the other classifiers in addition to its better prediction time than KNN and NB.

Table 24 and Table 25 summarize K-means and SIB clustering performance results when tested using the evaluation set.

Applying SIB clustering on the four datasets led to an overall cluster accuracy of 92.16% for the documents stemmed by ETS, 90.74% for the documents stemmed by Khoja's stemmer, and 91.25% for the documents stemmed by the Light stemmer.

TABLE 24

Multi-Clustering experiments results

|  | Original | ETS | Light | Khoja |
|---|---|---|---|---|
| K-means | 72.185% | 90.92% | 83.145% | 78.14% |
| SIB | 83% | 92.16% | 91.25% | 90.74% |

TABLE 25

Binary Clustering experiments results

|  | Original | ETS | Light | Khoja |
|---|---|---|---|---|
| K-means | 80.41% | 81.94% | 81.43% | 80.49% |
| SIB | 80.58% | 82.03% | 80.24% | 80.58% |

For binary clustering, applying SIB clustering on the two closely related datasets resulted in an overall cluster accuracy of 82.03%. The accuracy was 80.58% for the documents stemmed by ETS, 80.58% for the documents stemmed by Khoja's stemmer, and 80.24% for the documents stemmed by the Light stemmer.

Applying K-means clustering on the four datasets resulted in an overall cluster accuracy of 90.92% for the documents stemmed by ETS, 78.14% for the documents stemmed by Khoja's stemmer, and 83.145% for the documents stemmed by the Light stemmer.

For binary clustering, applying K-means clustering on the two closely datasets resulted in an overall cluster accuracy of 81.94% for the documents stemmed by ETS, 80.49% for the documents stemmed by Khoja's stemmer, and 81.43% for the documents stemmed by the Light stemmer.

The ETS stemmer's indexing accuracy score over the baseline by approximately 10% for binary clustering and 15.5% for multiclass clustering using the K-means clustering algorithm.

It improved clustering by approximately 1.5% for binary clustering and by 9% for multiclass clustering using the SIB-clustering algorithm.

K-means shows a higher sensitivity to the number of features. The Khoja stemmer's poor clustering results were expected since the Khoja stemmer tends to over stem words, which leads to creating similarities between unrelated documents containing the same roots for different words.

The inflectional nature of the Arabic language allows the same word to appear in many different forms in the corpus (i.e. suffixed, prefixed, infixed). Thus, when selecting a full-word index the weight of the word in the vector space model will be less as opposed to English words and feature space will be higher in dimensionality and more sparse.

Full Arabic words have less weight in the feature space and extracting features for Arabic documents is harder than for English documents.

Due to the nature of the Arabic language, which encourages sparsity, indexing plays a huge role in Arabic document classification and clustering.

Stemming Algorithm Effect on Improving Information Retrieval

Root indexing and light stemming are the most widely used indexing mechanisms in Arabic Information Retrieval (IR). Indexing has been defined as breaking the document into words or phrases that function as index terms for the document.

Extensive research was conducted to investigate the effect of these two indexing mechanisms on improving monolingual Arabic IR. As a result, several versions of Arabic light stemmers with various combinations of suffixes and prefixes were discussed in the literature. Other researchers debated that roots were the best way of indexing Arabic documents.

In this chapter, the new algorithm is adopted as an indexing mechanism to study its contribution to improving Arabic IR. The two prominent root-based and light stemming algorithms were investigated using non-stemmed word indexing as an evaluation baseline. To prove the effectiveness of stemming in enhancing IR effectiveness, we will compare the three indexing mechanisms to full word indexing. Additionally, we demonstrate how our algorithm was used as a Query Expansion Algorithm to determine related documents for each query in our IR evaluation process.

Arabic Information Retrieval Research

Arabic IR research matured in the early 90's. Prior to that, researchers were more concerned about coding and representing Arabic text. In all the previous experiments known to the present inventor, there were no automated stemming techniques. Stems needed to be created manually or by a user intervention to determine the word type (noun, verb or particle) and to determine the correct prefixes and affixes to be removed. Assigning grammatical categories to words is known as "tagging".

Experimental Settings

The Retrieval System

Online search engines are mostly based on IR indexing techniques. Google, the most famous search engine, released one of the first file system search engines in mid 2004 called Google Desktop Search (GDS).

File system search engines share the same mechanism as Internet search engines in that they both create document indices and execute queries against inverted files.

GDS is scalable, reliable, and efficient with the ability to automatically re-index the search space as it changes. GDS indexes and searches all users' files, regardless of their owner and allows the user to include or exclude specific memory locations (even adding external storage locations) and controls which file types to be indexed.

Figure 1:
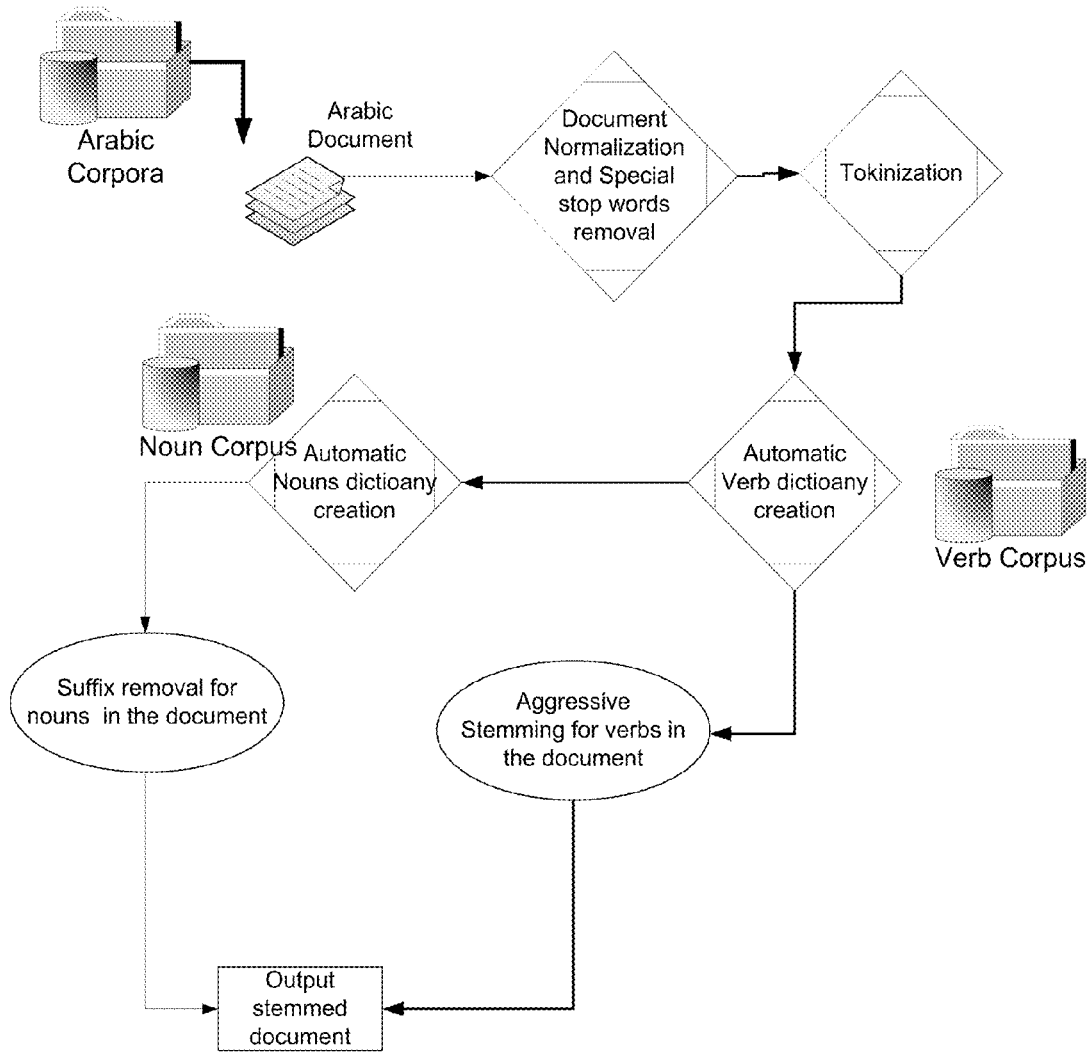
FIG. 1 is an illustration of a high-level process flow of an embodiment.

FIG. 7-1 below shows the typical mechanism of desktop search engines. The user submits his query and waits for the search engine to find the relative files index and their location on the hard drive. To avoid problems with the index size, we can have multiple index files. GDS has a similar mechanism with only one index file.

GDS is comprised of three executables:
1. GoogleDesktop.exe (also known as GoogleDesktopSearch.exe) creates a registry key at HKEY_USERS\<SID>\Software\Google\Google Desktop where <SID> and sets up an HTTP server on the local port 4664. This executable controls all the user interactions.
2. GoogleDesktopIndex.exe interfaces with the storage files. GDS uses a single crawler that indexes all file types.
3. GoogleDesktopCrawl.exe is responsible for passing through the file structure of the hard disk and reports changes to the GoogleDesktopIndex program. It sends notifications when any file is changed or updated.

Figure 14:
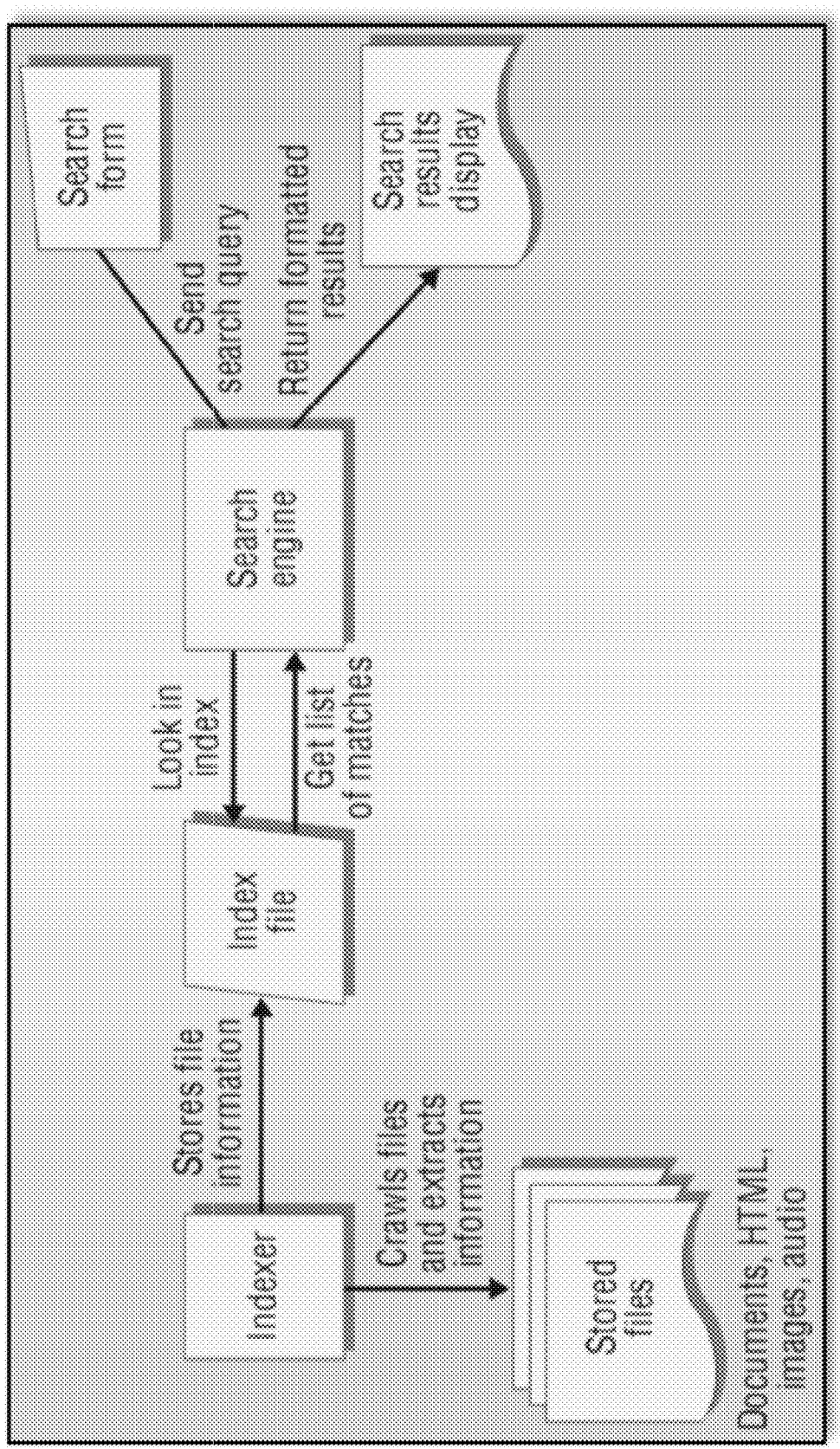
FIG. 14 is a graphical depiction of a desktop search engine.

FIG. 14 depicts a typical Desktop Search Engine.

We chose GDS to be our retrieval system and created three different experiments with the three different indexing mechanisms. Each experiment had both the queries and the datasets indexed using the Khoja stemmer, Light10 stemmer, and the ETS stemmer.

Document Collection

We used the same dataset we created for our previous experiments (refer to chapter 5 for details). The dataset consists of 2,754 documents that contains 410,030 words which are divided into four groups: academic (810 documents), technological (770 documents), psychological (477 documents), and general health (698 documents).

Retrieval Systems Evaluation

There are various measures for measuring the performance of any IR system. Most measures assume binary relevancy. The document is either relevant or non-relevant (see FIG. 15) with the assumption that the relevancy of the document is known. The measures I used were the classical precision and recall measures. I also used the F-measure in an attempt to measure the system's ability to retrieve relevant documents. These measures will be explained below, but prior to that, I would like to introduce the confusion matrix (see Table 28).

Figure 15:
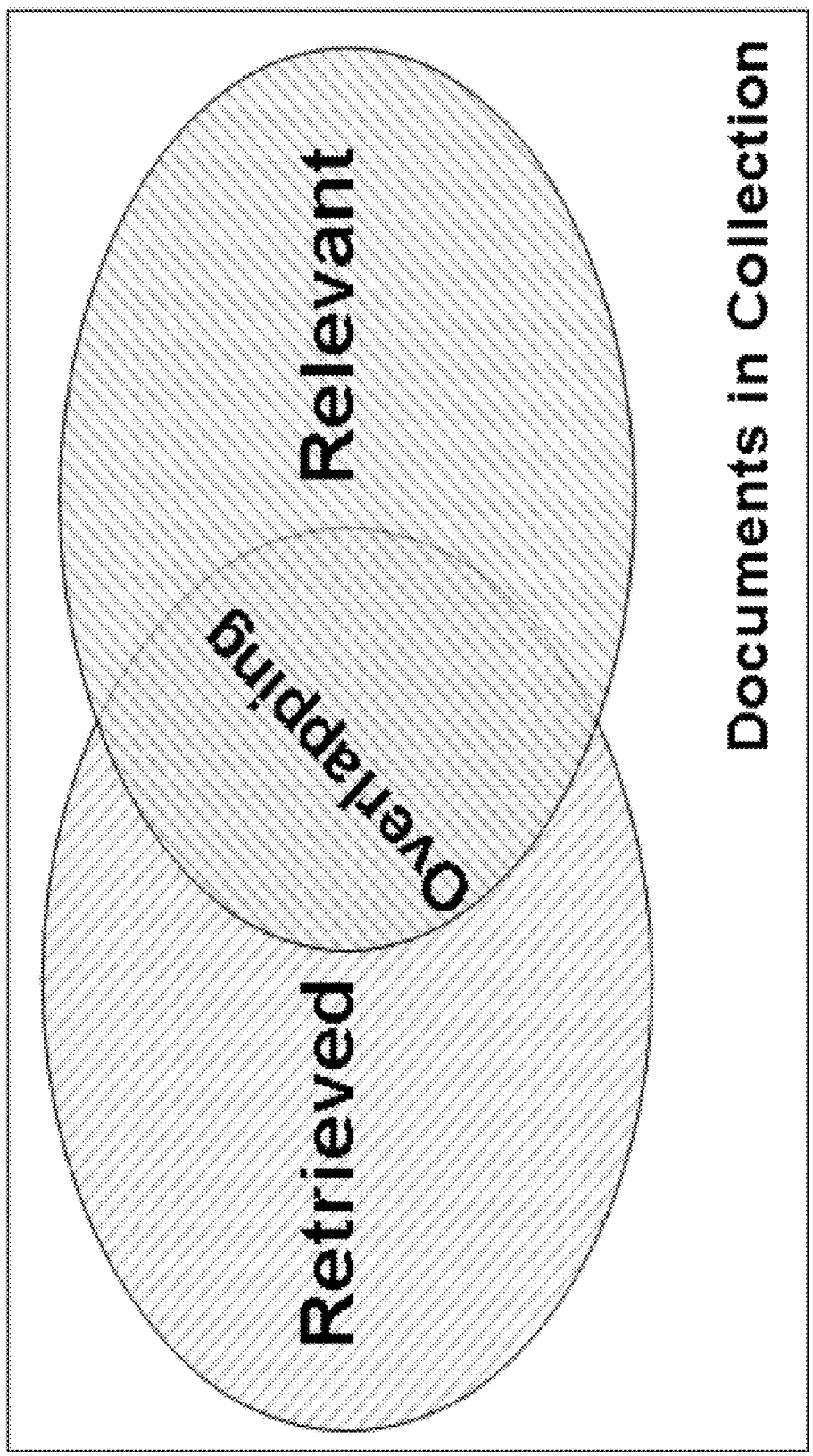
FIG. 15 is a graph of recall and precision.

FIG. 15 depicts a graph of Recall and Precision.

TABLE 26

The 25 Queries

| | English Translation | Query |
|---|---|---|
| Q1 | Notebook computer viruses | فيروسات الكمبيوتر الدفتري |
| Q2 | My nutrition in Ramadan | غذائي في رمضان |
| Q3 | Diabetes | أعراض مرض السكري و الضغط |
| Q4 | Tumors of skin cancer | أورام سرطان الجلد |
| Q5 | Semi-paralysis | الفالج |
| Q6 | Bedwetting | التبول اللاإرادي |
| Q7 | Graduates of the intermediate stage | خريجي المرحلة المتوسطة |
| Q8 | Autism | مرض التوحد |
| Q9 | Urinary tract infection | إلتهاب المسالك البولية |
| Q10 | Nokia Device | جهاز نوكيا |
| Q11 | Calcium tablets | أقراص كالسيوم |
| Q12 | Digital Camera | كاميرا نوكيا الرقميه |
| Q13 | Protecting your device from viruses | حماية جهازك من الفيروسات |
| Q14 | Intelligent phones | التقنية الذكية |
| Q15 | Google Video | غوغل فيديو |
| Q16 | Tingling | تنميل |
| Q17 | Scanner | مكبرات الصوت للكمبيوترات الدفترية |
| Q18 | speakers for PC notebooks | مكبرات الصوت للكمبيوترات الدفترية |
| Q19 | Web applications | تطبيقات الويب |
| Q20 | Coma | الغيبوبة |
| Q21 | Nursing and Education | التدريس والتمريض |
| Q22 | Bouts of diarrhea and constipation | نوبات الإسهال والإمساك |
| Q23 | Low School at Kuwait University | كلية الحقوق في جامعة الكويت |
| Q24 | Encephalitis | الالتهاب الدماغي |
| Q25 | Metabolism | التمثيل الغذائي |

TABLE 27

The 25 Queries processed using the three stemmers

| | Query | Khoja | Light10 | ETS |
|---|---|---|---|---|
| Q1 | فيروسات الكمبيوتر الدفتري | فيروس كمبيوتر دفتر | فيروس كمبيوتر دفتر | فيروس كمبيوتر دفتر |
| Q2 | غذائي في رمضان | غذائ رمض | غذائ رمض | غذاء رمضان |
| Q3 | أعراض مرض السكري و الضغط | أعراض مرض سكر الضغط | أعراض مرض سكر ضغط | عرض مرض سكر ضغط |
| Q4 | أورام سرطان الجلد | أورام سرط جلد | ورم سرط جلد | ورم سرطان جلد |
| Q5 | الفالج | فالج | فالج | فالج |
| Q6 | التبول اللاإرادي | بول ردأ | تبول لاراد | تبول ارادي |
| Q7 | خريجي المرحلة المتوسطة | خرج رحل وسط | خريج مرحلة متوسط | خريج مرحلة متوسط |
| Q8 | مرض التوحد | مرض وحد | مرض توحد | مرض توحد |
| Q9 | إلتهاب المسالك البولية | بول سلك لهب | تهاب مسالك بول | التهب مسلك بول |
| Q10 | جهاز نوكيا | جهاز نك | جهاز نوكيا | جهاز نوكيا |
| Q11 | أقراص كالسيوم | قرص سوم | أقراص سيوم | قرص كالسيوم |
| Q12 | كاميرا نوكيا الرقميه | كاميرا نك رقم | كاميرا نوكيا رقم | كاميرا نوكيا رقم |
| Q13 | حماية جهازك من الفيروسات | حما جهز فيروس | حما جهازك فيروس | حمايه جهاز فيروس |
| Q14 | التقنية الذكية | تقن نك | تقن ذك | تقنية ذكي |
| Q15 | غوغل فيديو | قانكي | غوغل فيديو | غوغل فيديو |
| Q16 | تنميل | نمل | تنميل | تنميل |
| Q17 | ماسحة ضوئية | مسح ضوا | ماسح ضوئ | ماسح ضوء |
| Q18 | مكبرات الصوت | كبر صوت | مكبر صوت كمبيوتر | مكبر صوت كمبيوتر دفتر |
| Q19 | تطبيقات الويب | طبق ويب | تطبيق ويب | تطبيق ويب |
| Q20 | الغيبوبة | غيبوب | غيبوبة | غيبوبة |
| Q21 | التدريس والتمريض | درس مرض | تدريس تمريض | تدريس تمريض |
| Q22 | نوبات الإسهال والإمساك | نوب سهل مسك | نوب إسهال إمساك | نوبه إسهال إمساك |
| Q23 | حقق جمع كلا | كلي حقوق جامع | كلية الحقوق الجامعية | كلية حقوق جامعي |
| Q24 | الالتهاب الدماغي | لهب دمغ | التهاب دماغ | التهاب دماغ |
| Q25 | التمثيل الغذائي | مثل الغذائي | غذائ تمثيل | تمثيل غذاء |

TABLE 28

The Confusion Matrix

| | Relevant | Not relevant |
|---|---|---|
| Retrieved | a (True Positive) | b (False Positive) |
| Not Retrieved | c (False Negative) | d (True Negative) |

Precision is usually the proportion of retrieved and relevant documents to all the documents retrieved by a query.

$$Percision = \frac{a}{|\{a+b\}|}$$

$$Percision = \frac{|\{relevantdocuments\} \cap \{retrieveddocuments\}|}{|\{retrieveddocuments\}|}$$

Precision considers all retrieved documents. For example, if the search retrieved 1,000 documents and 600 of these are relevant, the precision is 60%.

Recall is the proportion of the number of relevant records retrieved out of the total number of relevant records available. Recall is also called sensitivity in binary classification.

$$Recall = \frac{a}{|\{a+d\}|}$$

$$Recall = \frac{|\{relevantdocuments\} \cap \{retrieveddocuments\}|}{|\{retrieveddocuments\}|}$$

For example, if the search retrieves 100 relevant documents and you know that there are 1,000 relevant documents, the recall is 10%.

Both recall and precision are represented as a percentage. Recall represents the IR system's ability to retrieve all the relevant documents, while precision represents the IR system's ability to screen out irrelevant documents.

Recall and precision are interrelated; an increase in recall causes precision decreases and vice versa. Thus, neither recall nor precision measures are sufficient by themselves.

The F-measure combines recall and precision with an equal weight (also called F1 measure). Thus, the F-measure is considered a stronger measure.

$$F = 2 \times \frac{(Precision \times Recall)}{(Precision + Recall)}$$

Queries Design

We took the weaknesses of Arabic stemmers as discussed in previous chapters into consideration when designing the queries. We crafted the queries to cover all the well known Arabic stemmer issues. These issues are:

Stemming naked (non-prefixed) and prefixed nouns.
Stemming Arabized words.
Stemming plurals (regular and broken).

As shown in Table 26, our queries had various lengths: one term, double terms, three terms, and four terms. The three stemmers normalized and stemmed the queries in order to conduct the retrieval experiments on the three retrieval systems.

Query Expansion

In order to evaluate the performance of any IR system, we need to know all the relevant documents (performance baseline) and thus the query submitted to the IR system should include all the possible derivations of a word. Enhancing a query to increase the number of matched documents is referred to as, "Query expansion" (QE). QE is the process of reformulating the query to improve retrieval performance. It can be achieved by either finding synonyms, morphological variations, or correcting spelling errors.

Various Arabic QE techniques were discussed in the literature including finding synonyms (using WordNet), finding the root and creating all the possible derivations, and expanding high frequency terms.

We used the concept groups created by our stemmer to expand the queries and create the relevance judgments for the 25 queries in addition to Microsoft desktop search. Table 29 shows an example of an English concept group created by our stemmer using the affix and prefix list shown in Appendix F and the text file shown in Appendix G.

Case Study

In order to evaluate the contribution of our system in improving web retrieval, we conducted two small experiments using Google.com.

A small program was created to perform automated web search by submitting a query and the expanded query to Google.com to allow the user to view the recall improvements.

Prior to that, small documents in Arabic and English were submitted to our ETS stemmer in order to create the expanded queries (i.e. the concept groups).

Table 30 and Table 31 show the used keywords and the search results in English and in Arabic respectively.

By viewing the search results, it is surprising how adding another form of the word improves recall dramatically and how Google.com is still unable to provide the user with the appropriate search results.

For example, the query: "situation" returns 341,000,000 pages while the Query "situation OR situations" return 438,000,000 pages. Another example is when using the query: "understand" and the query "understand OR understanding", the first query retrieves 340,000,000.00 pages where the second query retrieves 566,000,000.00 pages.

This demonstrates that Google.com is not using a specific stemming mechanism and how creating a layer of a QE is very good solution to improve web retrieval. The same applies to the Arabic language as demonstrated in Table 31.

TABLE 29

Example of the English Concept Groups Used in QE

| | |
|---|---|
| arab: arabic, arabian, arabs, arabs, arabia | written: unwritten |
| less: lesser | qur'an: qur'anic |
| language: languages | follow: followed |
| term: terms | norms: normal |
| africa: african, africans | national: nationality, nationalities |
| different: differentiation, differences | situation: situations |
| exist: existing | provides: provided |
| region: regional | example: examples |
| intelligible: unintelligible | separate: separately |
| use: used, uses | case: cases |
| common: commonly | speak: speaking |
| communicate: communication | country: countries |
| school: schools | switch: switching |
| derive: derived, derives | sentence: sentences |
| old: older | morocco: moroccan |
| dialect: dialects, dialectal | respective: respectively |
| group: groups | understand: understanding |
| islam: islamic | part: parts |
| century: centuries | source: sources |
| word: words | direct: directly, indirectly |
| world: world's | number: numbers |
| europe: european | include: includes |

TABLE 29-continued

Example of the English Concept Groups Used in QE

| | |
|---|---|
| philosophy: philosophical | sahara: saharan |
| borrow: borrowing, borrowed, borrowings | iraq: iraqi |
| influence: influenced | muslim: muslims |
| see: seen | thamud: thamudic |
| particular: particularly | kingdom: kingdoms |
| rule: rules | fih: fihi |
| andalus: andalusi | algeria: algerian |
| early: earliest | tunisia: tunisian |
| refer: refers | libya: libyan |
| called: caller | niger: nigeria |
| consider: considered | bahran: bahraini |
| varies: variety | hejaz: hejazi |

TABLE 30

Queries in English Submitted to Google

| Keyword | Search Result |
|---|---|
| written | 476,000,000.00 |
| written OR unwritten | 481,000,000.00 |
| follow | 490,000,000.00 |
| follow OR followed | 694,000,000.00 |
| norms | 16,900,000.00 |

TABLE 30-continued

Queries in English Submitted to Google

| Keyword | Search Result |
|---|---|
| norms OR normal | 567,000,000.00 |
| situation | 341,000,000.00 |
| situation OR situations | 438,000,000.00 |
| provides | 493,000,000.00 |
| provides OR provided | 1,200,000,000.00 |
| example | 577,000,000.00 |
| example OR examples | 753,000,000.00 |
| separate | 256,000,000.00 |
| separate OR separately | 319,000,000.00 |
| case | 1,090,000,000.00 |
| case OR cases | 1,460,000,000.00 |
| speak | 222,000,000.00 |
| speak OR speaking | 380,000,000.00 |
| country | 1,400,000,000.00 |
| country OR countries | 1,830,000,000.00 |
| switch | 332,000,000.00 |
| switch OR switching | 381,000,000.00 |
| sentence | 74,000,000.00 |
| sentence OR sentences | 107,000,000.00 |
| respective | 209,000,000.00 |
| respective OR respectively | 331,000,000.00 |
| understand | 340,000,000.00 |
| understand OR understanding | 566,000,000.00 |

TABLE 31

Queries in Arabic Submitted to Google

| Keyword | Search Result |
|---|---|
| عاد | 18,300,000.00 |
| عادOR لاعاد OR واعاد OR لاعادت OR واعادت OR بعاد OR لاعاده | 20,700,000.00 |
| حسن | 47,500,000.00 |
| OR وحسن OR يحسن OR ويحسن OR يتحسن OR لحسن OR تحسن OR فيحسن OR وتحسن OR حسنOR احسن | 83,000,000.00 |
| نوع | 50,200,000.00 |
| نوعOR وتنوع ORمتنوع OR انواع | 55,400,000.00 |
| مزامنه | 54,800.00 |
| مزامنهOR ومزامنه | 56,000.00 |
| طلب | 47,300,000.00 |
| OR تطلب OR متطلب OR وستطلب OR متطلباتهم OR لطلب OR طلبك OR يتطلب OR طلب OR متطلبين OR طلبت OR اطلب OR ويطلب OR سيطلب OR متطلباتي OR متطلباته OR تطلب OR اطلب | 58,000,000.00 |
| تضمن | 2,320,000.00 |
| OR فتتضمنOR ويتضمن OR وتضمن OR تتضمن OR لتتضمن OR سيتضمن OR يتضمن OR تضمن OR فتضمنOR لتضمن | 7,820,000.00 |
| متطلباتهم | 12,300,000.00 |
| OR فضلت OR يفضل OR تفضل OR بافضل OR وبفضل OR وتفضل OR وفضلت OR يفضلون OR تنزل OR لافضل | 102,000,000.00 |
| نزل | 6,470,000.00 |
| نزلOR وتنزل OR تنزل | 9,430,000.00 |
| عرض | 328,000,000.00 |
| OR تعرض OR وتعرض OR تتعرض OR عرضا OR ويعرض OR فيعرض OR يتعرض OR عرض OR واعرض OR كعرض OR لتتعرض | 339,000,000.00 |
| برمج | 319,000.00 |
| برمجOR برمجه | 10,500,000.00 |
| تعد | 8,360,000.00 |
| تعدOR وتعد OR تعدت OR لتعد OR تعدي | 10,100,000.00 |
| مجموع | 61,300,000.00 |
| مجموعOR مجموعه OR ومجموعه OR بمجموعه | 130,000,000.00 |
| تحدث | 9,540,000.00 |
| تحدثOR تحدث OR نتحدث | 12,300,000.00 |

Experimental Results Evaluation and Concluding Remarks

In this section, I will discuss and analyze the retrieval results achieved by the three IR retrieval systems. Our system showed a balance between the recall and precision values and showed a superiority over the other stemmers by achieving the highest F measure of a 0.98167 value. In the IR system, using Khoja's roots for indexing achieved and average F measure of 0.7629 with a very low precision values caused by over-stemming and conflating unrelated words.

The Light stemmer, on the other hand, achieved an average F measure of 0.8839 with a very low recall average value where it could not retrieve all the documents in many cases. The IR system based on the Light10 indexing retrieved the purist results, but not all the results.

It is also obvious that word indexing reduced the IR effectiveness to the extent that even the worst stemmer achieved better results. The average F measure was 0.6939.

Verbal Nouns:

An example of verbal nouns appears in queries 9, 16, 19, 24, and 25.

Words such as "applications," "nursing," "infections," "tingling," and "metabolism" were successfully conflated to their roots in some of the cases by the Khoja stemmer. Other stemmers failed to conflate any of them.

When we use the word, "failed," we meant failure to linguistically find the root. However, as we explained in the last chapters, the root and the derived words would not necessarily be semantically related.

TABLE 32

Example of the Query Terms Stemmed by Khoja

| Query term in English | Applications | Nursing | Infection | Tingling | Metabolism |
|---|---|---|---|---|---|
| Root by Khoja | طبق | مرض | لهب | نمل | مثل |
| English translation | Applied | Disease | Flame | Ant | Like |

As seen in Table 32, except for the word, "application," all the other roots are not semantically related to the original query term, which explains the high recall values and the low precision values for the Khoja stemmer.

By avoiding handling infixes, both the Light10 and the ETS stemmers succeeded in preserving the same meaning of the query term, which explains the lower recall values.

Plurals

The cases of plurals can be seen in queries 3, 4, 9, 18, 19, and 22.

Broken plurals, seen in queries 3, 4 and 9, can be stemmed correctly by both our stemmer and the Khoja stemmer due to pattern matching. The major difference between our stemmer and the Khoja stemmer is that our stemmer uses patterns so that the plural is transformed to the singular form, but with the Khoja stemmer, broken stemmers are conflated to the root which may or may not be semantically related. The light stemmer, on the other hand, cannot deal with broken plurals.

Regular plurals are easily dealt with by removing the related suffixes in our stemmer and the Light10 stemmer.

Although the Khoja stemmer can deal with both broken and regular plurals by conflating them to their roots, the Khoja stemmer failed to deal with plurals in general when they were of a quadratic root or were Arabized words (e.g. query 1 and query 13)

Stripping Extra Letters

The light stemmer, as explained previously, removes a fixed set of prefixes and suffixes as long as the resulting stem length is more than two letters. The word "infection" starts with "al" in Arabic as an original letter, which is equivalent to the definite article "al." In this case, the Light10 stemmer treated the "al" as a prefix and removed it, creating a meaningless word even though it was an original part of the word. In this case, when the word was prefixed by a real definite article in the processed date, we could not conflate the words with definite articles with the ones that did not have them.

The same problem appeared in query 11 where the light stemmer removed the first three original letters of the word, "calcium." This issue caused the reduction of the IR systems using the Light10 stemming.

Arabized Words and Prefixed Nouns

Conclusion

Stemming, in general, improves IR for the Arabic language. The IR system, using our indexing mechanism, outperformed the leading Arabic stemmers. We do not claim that our stemmer can handle all the problems facing monolingual Arabic IR, but we can reduce them to increase retrieval efficiency.

Our stemmer efficiently removes prefixes and suffixes. It also reduces the effect of Arabized words by grouping them into only one form prior to submitting them to the stemmer.

The QE expansion process we used to find the related articles can be used alone with any search engine to increase recall without reducing the precision.

TABLE 33

Relevance Judgments for the 25 Queries

| Query # | #Rel Documents | Document number |
|---|---|---|
| Q1 | 5 | 157, 223, 277, 319, 737 |
| Q2 | 14 | 1, 5, 6, 7, 10, 11, 13, 14, 15, 16, 18, 19, 21, 25 |
| Q3 | 15 | 50, 65, 87, 157, 170, 213, 290, 463, 464, 465, 466, 479, 621, 641, 682 |
| Q4 | 15 | 91, 95, 96, 127, 136, 191, 315, 437, 455, 510, 512, 518, 519, 546, 247 |
| Q5 | 3 | B156, gh280, gh641 |
| Q6 | 7 | 257, 298, 643, 647, 650, 654, 678 |
| Q7 | 1 | 594 |
| Q8 | 2 | 204, 205 |
| Q9 | 13 | 73, 384, 298, 627, 628,, 632, 640, 644, 664, 677, 679, 684, 68 |
| Q10 | 7 | 448, 487, 541, 611, 743, 747, 767 |
| Q11 | 3 | 24, 30, 64 |

TABLE 33-continued

Relevance Judgments for the 25 Queries

| Query # | #Rel Documents | Document number |
|---|---|---|
| Q12 | 5 | 448, 487, 541, 743, 747 |
| Q13 | 15 | 223, 438, 466, 520, 521, 606, 623, 654, 665, 674, 737, 759, gh72, gh154, gh162 |
| Q14 | 26 | Ac718, t201, 211, 352, 362, 437, 459, 483, 497, 498, 559, 568, 579, 586, 587, 618, 619, 694, 697, 729, 734, 742, 743, 744, 745, 747 |
| Q15 | 3 | 487, 611, 716 |
| Q16 | 8 | B10, 35, 70, 85, 132, 181, gh256, gh276 |
| Q17 | 14 | 54, 55, 66, 214, 216, 217, 353, 476, 577, 629, 666, 669, 670, 687 |
| Q18 | 8 | 238, 381, 383, 427, 460, 470, 633, 671 |
| Q19 | 8 | 63, 89, 487, 611, 743, 747, 754, 705 |
| Q20 | 14 | B2, 313, 363, 415, 421, gh186, 250, 296, 370, 401, 501, 539, 541, 672 |
| Q21 | 8 | Ac333, 541, 542, 547, 616, 666, 713, 799 |
| Q22 | 5 | 1b, 467, 124gh, 208, 292 |
| Q23 | 22 | 236, 354, 419, 423, 425, 426, 452, 471, 504, 508, 524, 526, 551, 601, 615, 667, 680, 692, 697, 774, 788, 802 |
| Q24 | 14 | 3b, 43, 213, 392, 421, 153gh, 202, 235, 245, 254, 296, 366, 401, 541 |
| Q25 | 21 | 16gh, 22, 28, 50, 94, 129, 157, 158, 160, 165, 170, 173, 192, 397, 474, 536, 538, 539, 541, 213b, 392 |

TABLE 34

The Performance of the 3 Stemmers Represented using Recall, Precision, and F-measure

| | No-Stemming | | ETS | | Khoja | | Light | |
|---|---|---|---|---|---|---|---|---|
| | R | P | R | P | R | P | R | P |
| Q1 | 0.6 | 1 | 1 | 1 | 0.4 | 1 | 0.6 | 1 |
| Q2 | 0.143 | 1 | 1 | 1 | 0.643 | 1 | 0.857 | 1 |
| Q3 | 0 | 0 | 1 | 1 | 1 | 0.295 | 0.6 | 0.692 |
| Q4 | 0.267 | 1 | 1 | 1 | 1 | 1 | 0.6 | 1 |
| Q5 | 0.333 | 1 | 1 | 1 | 1 | 1 | 1 | 1 |
| Q6 | 0.286 | 1 | 0.857 | 1 | 1 | 0.368 | 0.286 | 1 |
| Q7 | 1 | 1 | 1 | 1 | 0.2 | 1 | 1 | 1 |
| Q8 | 1 | 1 | 1 | 1 | 1 | 0.0625 | 1 | 1 |
| Q9 | 0.846 | 1 | 1 | 1 | 0.923 | 0.8 | 0.923 | 1 |
| Q10 | 1 | 1 | 1 | 1 | 1 | 0.7 | 1 | 1 |
| Q11 | 1 | 1 | 1 | 1 | 0.667 | 0.5 | 1 | 1 |
| Q12 | 0.8 | 1 | 1 | 1 | 0.8 | 0.667 | 1 | 1 |
| Q13 | 0.4 | 1 | 0.917 | 0.917 | 0.833 | 0.67 | 0.416 | 0.833 |
| Q14 | 0.154 | 1 | 1 | 1 | 0.96 | 0.96 | 1 | 1 |
| Q15 | 0.333 | 1 | 1 | 1 | 0.667 | 1 | 0.667 | 1 |
| Q16 | 0.375 | 1 | 1 | 1 | 0.276 | 1 | 1 | 1 |
| Q17 | 0.143 | 1 | 0.786 | 1 | 1 | 0.56 | 0.715 | 1 |
| Q18 | 0.25 | 1 | 1 | 1 | 0.25 | 1 | 0.75 | 1 |
| Q19 | 0.25 | 1 | 1 | 1 | 1 | 0.8 | 1 | 1 |
| Q20 | 0.5 | 1 | 1 | 1 | 1 | 1 | 1 | 1 |
| Q21 | 0.25 | 1 | 1 | 1 | 1 | 0.0145 | 1 | 1 |
| Q22 | 0.8 | 1 | 1 | 1 | 1 | 0.545 | 0.8 | 1 |
| Q23 | 0.91 | 1 | 1 | 1 | 0.864 | 0.241 | 1 | 1 |
| Q24 | 0.286 | 1 | 1 | 1 | 1 | 0.667 | 0.42857 | 1 |
| Q25 | 0.7 | 1 | 1 | 1 | 1 | 0.556 | 0.672 | 1 |
| Avg | 0.54332 | 0.96 | 0.9817 | 0.9965 | 0.8175 | 0.71521 | 0.8048 | 0.980 |
| F | 0.6939 | | 0.9890 | | 0.7629 | | 0.8839 | |

Conclusion and Future Work

The Educated Arabic Stemmer (ETS) Algorithm was designed to tackle many issues related to the processing of Arabic documents. During our design and implementation phases, we were able to achieve many goals:

1. We created the first independent Arabic tagger that relies only on syntactical Arabic sentences.
2. We created a cohesive list of more than 3700 words in an attempt to standardize this Arabic text-processing step.
3. We defined "local stem": a new indexing mechanism that can be an alternative to root and stem indexing.
4. We built an automated keywords grouping mechanism to use in query modifications and expansion.
5. We compressed a large number of documents and reduced the vocabulary size without changing the meaning of the words.
6. The new indexing mechanism "local stem" can increase recall and precision of an IR system, when applied on categorized documents
7. We used the "local stem" as a feature reduction mechanism and improved Arabic text classification and clustering.

The research reveals the superiority of our stemmer over the other peer stemmers linguistically and in the fields of IR and text mining. Researchers interested in extracting roots can use our system as an initial stage prior to the use of the Khoja stemmer.

Fundamentals of the Arabic Language

Some languages share a similar structure; others differ syntactically and semantically. For example, the lexical similarity between Portuguese and Spanish is approximately 89% due to their Latin origin as well as a common history of Arabic influence. Asian languages, on the other hand, use a different semantic structure than Latin languages, where ideographs or symbols are used to represent words. Thus, text processing algorithms developed for a specific language cannot be directly applied to other languages.

The Arabic language, which is the focus of this research, is a Semitic language that has many different characteristics than other languages. Unlike most Western languages, Arabic script writing orientation is from right to left. In comparison to English, the Arabic language has a composite morphology and words are categorized as particles, nouns, or verbs where adjectives and pronouns are considered nouns.

This chapter will briefly introduce Arabic language characteristics and provide the reader with the essential knowledge needed to understand the problems caused by the complicated structure of the language. This is particularly important when these problems create a barrier to applications such as text mining, information retrieval, natural language processing, and translation.

Arabic Particles

There are 29 constant particles in Arabic that connect to form a word. Arabic particles fall into two categories: particles of construction and particles of signification. Particles of construction (shown in Table 2-1) are the letters used to form a word, while particles of signification are used to form sentences and to modify verbs, nouns, or both. Particles of signification can be a combination of particles or a single particle attached to a word (affixes) such as definite articles and conjunctions. Possible Arabic prefixes are shown in Table 35.

Affixes can be a particle or a combination of particles as in pronouns. For example, there are specific suffixes to convert the word from the singular form to the plural form and others to convert from masculine to feminine. According to at least one determination, there are 1,440 different verb forms that can result from adding affixes to a specific verb and 120 different nouns that can result from adding affixes to a noun. Affixes can be added to the beginning of the word (prefixes), the end of the word (suffixes), and the middle of the word (infixes).

In English, infixes do not exist, and words are formed by attaching prefixes and suffixes to either or both sides of the root. For example, Table 26 shows the formation of the word "Untouchables."

FIG. 20 is a depiction of characters shape differing as their position in the word changes.

Furthermore, most of the particles differ in shape based on their position in the sentence and adjunct letters. FIG. 20 below demonstrates how some of the Arabic particles change in shape. The word, "bab," in the figure means "door." It starts and ends with the same letter (ب) pronounced, "Ba." However, as shown in the figure, the same letter is written differently when the location of the letter changes. In the second line of FIG. 20, with the word, "Mohammad," which has the letter (م) pronounced "M" at the middle and the beginning, the letter "M" is shaped differently depending on its location.

TABLE 35

Arabic Prefixes

| Combination | Meaning |
|---|---|
| بال | in the |
| ال | the |
| فال | and the, therefore the |
| كال | like the |
| لل | for the, to the |
| ولل | And (for the, to the) |
| وال | and the |
| فبال | therefore in the |
| وبال | and in the |
| وكال | and like the |
| ولال | and for the |
| فب | and in, therefore in |
| وب | and in |
| فل | and for, therefore to |
| ول | and for, and to |
| ب | in, with |
| ف | and, therefore |
| ا, ي, ت, ن | The tense of the person of conjunction |
| ك | like, as |
| ل | for, to |
| ول | And (for, to) |
| و | and |
| س | will |
| فس | Then will |
| وس | And will |

TABLE 36

Example of English Prefixes and Suffixes

| Un | touch | able | s |
|---|---|---|---|
| Prefix | Root | First Suffix | Second Suffix |

Vowels

Like English, Arabic has vowels and consonants, but Arabic main (short) vowels are symbols, not letters. These symbols are added above or below the Arabic text and known as "short vowels" (or "diacritics"). Table 37 shows the three short vowels.

FIG. 21 is a depiction of un-vocalized and vocalized Arabic text.

In FIG. 21, the short vowels are represented by dashes above and below the letters (Fatha and Kasra), small circles (sokoon), a small "w" shape (shaddah), double dashes (tanween), and a comma shape (damma) above the letter. These small shapes are called harakaat and, along with the long vowels, correspond to e, a, and i (shown in Table 37).

TABLE 37

Short Vowels

| Shape | ؍ | ؍ | ؍ |
|---|---|---|---|
| Name | Kasra | Fatha | Dammah |
| Pronunciation | e | a | o |

These short vowels are very powerful; the whole meaning of the word can change by rearranging the shape or position of a vowel. Additionally, a vowel can change the tense of a verb. Unfortunately, these short vowels are omitted in modern written Arabic (un-vocalization). This omission causes confusion for the reader, especially when the words are read out of context. The un-vocalized Arabic representation creates ambiguity, which is a large barrier in Arabic text processing, translation, transliteration, and text summarization.

Figure 2:
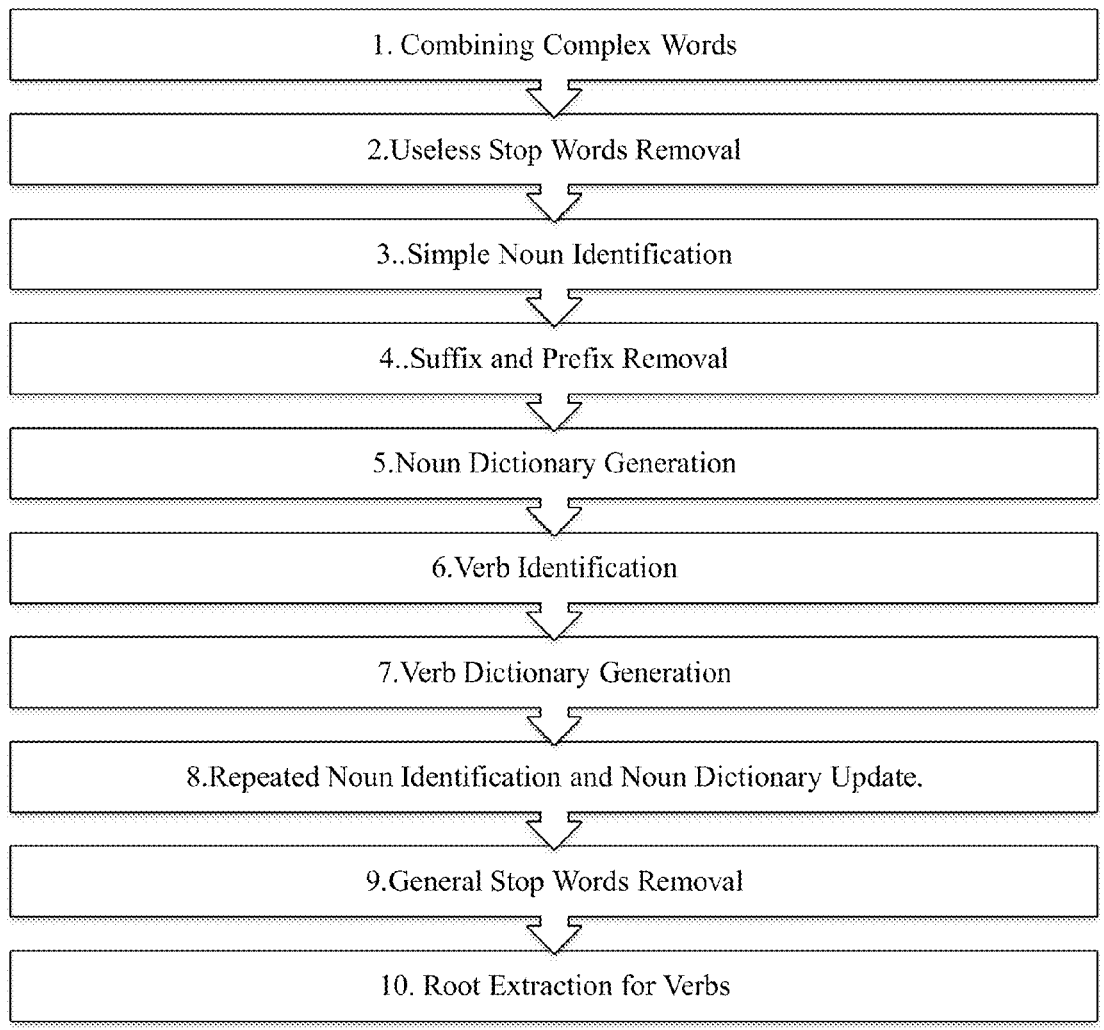
FIG. 2 is an illustration of another high-level process flow of an embodiment.

In FIG. 2-3, two words are written in the same way, but with different diacritics. The first word on the left means "seeds" and the word next to it means "love." It is clear how eliminating the diacritics can create confusion and how a translation task can produce the wrong meaning due to the ambiguity.

FIG. 22 is a depiction of two similar words with different meanings.

In addition to short vowels, Arabic has long vowels and double vowels. Double vowels, "tanween," always come at the end of the word (as shown in FIG. 21). Double vowels have no effect on the word meaning, thus I will not elaborate on them.

Long vowels (shown in Table 38), on the other hand, are the particles Alef, Ya'a, and Waaw. Alef gives the same effect as the "aa" in English, Ya'a gives the same effect as the "ee" in English, and Waw gives the same effect as "oo" in English. Table 38 shows the Arabic characters for the long vowels.

TABLE 38

Arabic Long Vowel Characters

| ي | و | ا |
|---|---|---|
| Ya'a | Waaw | Alif |

The problem with long vowels is that they can be either infixes or part of the root; they are referred to as weak letters, which can be confusing. Stemmers cannot decide whether to eliminate them or to keep them when stemming the word.

Arabic Root Base System

Arabic and English are very different languages from two unrelated families. Arabic is a Semitic language based on a root-based system. A root is the original form of a word that cannot be analyzed. In English, a root can be a verb, noun, or an adjective, whereas in Arabic, roots are only verbs. The majority of Arabic roots are tri-literal. It has been estimated that there are around 10,000 independent roots. Each root word can have prefixes, suffixes, infixes, and regular and irregular tenses to derive nouns and adjectives. The addition of infixes is based on specific patterns. Words constructed from the same root are not necessarily semantically related. Furthermore, the brevity of the language leads to multiple meanings of a single root.

In linguistics, a root is a morpheme. A morpheme has been defined as the smallest inseparable linguistic word or piece of word with a grammatical function. Additionally, affixes and stems are both examples of a morpheme.

A stem is a morpheme that accepts another morphological piece such as an affix. A stem can be simple with one morphological piece or compound with two pieces. For example, the word wheelchair is a stem that is a compound of two roots: wheel and chair.

Table 39 below displays an example of the Arabic word شارب (drinker) and its stems with the common prefixes and suffixes.

FIG. 23 is a depiction of an Arabic infix example.

Affixes cause a serious issue in stemming Arabic documents because it is hard to differentiate between the letters of root characters and affix letters. For example, for the root "drink" شرب in Arabic, adding the infix letter "ا" circled in FIG. 23 formed a different word: شارب "drinker".

TABLE 39

Arabic Example

| Root | شرب | drink |
|---|---|---|
| Prefixes | ال | the |
| Stem | شارب | drinker |
| Suffixes | ان , ين | dual |
| Suffixes | ون | plural |
| Suffixes | ة | feminine |
| الشاربين | the drinkers | (dual) |
| الشاربان | the drinkers | (dual) |
| الشاربين | the drinkers | (plural) |
| الشارب | the drinker | (masculine) |
| الشاربة | the drinker | (feminine) |

Nouns

A noun is "a word that indicates a meaning by itself without being connected with the notion of time". As mentioned above, nouns are driven from the root by applying specific patterns that control the addition of affixes.

Both Arabic and English nouns can have irregular plurals in rare cases, but Arabic nouns can have both an irregular (i.e. plurals not derived from the singulars) and a regular plural at the same time. Furthermore, Arabic nouns have duals. The formation of duals and regular nouns is achieved by adding certain suffixes to the singular noun where masculine plural suffixes differ from feminine plural suffixes.

In English, only humans and animals can have a gender. As a result, objects such as book, car, house, door, etc. are referred to by using "it" with no gender association. However, in Arabic, nouns are either masculine or feminine. For example, the sun is feminine and the moon is masculine and referred to by using "he". In general, feminine nouns end with "taa' marbuta" which looks like (ة) or (ـة), "taa'" which looks like (ت), "ha'a'" which looks like (ه) or (ـه), "hamza" which looks like (ء), or "Alif maqsoora" which looks like (ى). A masculine word can be converted to a feminine word by adding "taa' marbuta" or a "ha'a" to the word body. Here are two examples:

Kalb كلب (dog masculine)-kalba كلبة (dog feminine)

Modarris مدرس (a male teacher) modarrisa مدرسه (a female teacher).

This richness in the language is confusing for machine learning and natural language processing. For example, to automatically group digital articles based on the keyword "teacher" in Arabic documents, we should take into consideration both male and female representation of the noun (i.e Modarris, which is male and Modarrisa, which is female). The reader might think that this is not an issue apart from tripling the size of the dictionary by including feminine representations that are just masculine nouns concatenated with the "taa'marbuta" and the "ha'a." Unfortunately, the above case cannot be generalized; there are two exceptions to the rule. The first exception is that some feminine nouns do not end with any of the above letters. Below are some feminine nouns that are considered exceptions:

The sun (shams) شمس
The wind (reeh) ريح

Secondly, not all humans and animals can share the same root. Two examples are:

Walad ولد (boy) Bent بنت (girl)
Rajol رجل (man) Imraa امراه (woman)

The failure to group the feminine and masculine representation of the same noun creates syntactically different features for semantically related Arabic documents. The created features will negatively affect machine learning applications and will cause a decrease in performance.

Arabic nouns can be either adjectives or proper nouns. Adjectives are used to describe a state of the proper noun (e.g. beautiful, small, and tall). A proper noun is the "name of a specific person, place, organization, thing, idea, event, date, time, or other entity". Arabic proper nouns can be simple or composite. Simple proper nouns are the proper nouns composed of only one word. For example, Muna (feminine) منى, Muhammad (masculine) محمد, Arabic names like Abdul Rahman عبدالرحمن, Abu Saleem أبوسليم and Abdu Allah عبدالله are considered composite proper nouns. Composite proper nouns are composed of more than one word. Composite proper nouns cause a problem when tokenizing Arabic documents where the compound word is tokenized as two terms. In contrast to English, Arabic proper nouns do not start with capital letters, which makes it particularly challenging for machines to recognize and extract proper nouns from Arabic texts.

Pronouns

Pronouns in Arabic are categorized into personal pronouns, possessive pronouns (shown in Table 40), demonstrative pronouns, and relative pronouns. Some pronouns are treated as stop words by most search engines such as:

1. Personal pronouns: pronouns used to replace nouns.
2. Demonstrative pronouns are equivalent to the use of "this/that and these/those" in English.
3. Relative pronouns are used to introduce subordinate adjectival clauses. They are similar to English relative pronouns like who, which, and that and are considered stop-words in Arabic text processing On the other hand, some pronouns are suffixed to words as seen with possessive pronouns and object pronouns. Possessive pronouns are suffixed to nouns to make them definite or to express possession, whereas object pronouns are suffixed to verbs. Below is an example of some possessive pronouns.

TABLE 40

| Possessive Pronouns | |
| --- | --- |
| Number | Suffixes |
| Singular | ي (my), ك (your), ه (his), ها (her) |
| Dual | هما (their), كما (your) |
| Plural | هم (their), هن (their), كم (your) |

2.6 Concluding Remarks

This background on the Arabic language should give the reader a basic understanding of the Arabic language script. The discussion of the complex nature of Arabic language morphology should prepare the reader to see the potential opportunities that motivated this research.

We can summarize difficulties facing Arabic text processing as follows:

1. Un-vocalized Arabic representation causes ambiguity.
2. The derivation to nouns and verbs from one root can generate semantically unrelated words.
3. The existence of irregular plurals prevents the creation of standardized stemming rules.
4. The huge number of roots in Arabic makes it more complex and expensive to use a dictionary.
5. It is hard to differentiate between the affixes and the original word letters.
6. Proper nouns are hard to identify in the Arabic sentence because they do not begin with capital letters.
7. The addition of affixes can change the whole meaning of the word.

Document preprocessing is a vital step to save indexing time and space, especially for a huge set of data. This step includes tokenization, stemming, stop words removal, and normalization.

Stemmers are basic elements in query systems, indexing, web search engines and information retrieval systems (IRS). Stemming is the process of reducing words to their roots (stem) in order for the text processing program to count (index) and recognize them as the same word. For example, the words dies, and died would be recognized as one word die. Stemming can be viewed as a recall-enhancing device or a precision-enhancing device. In the field of text mining, stemming is used to group semantically related words to reduce the size of the dictionary (feature reduction).

With Arabic stemming, words are reduced to their roots. Root-based indexing is aggressive in the sense that it reduces words to their three-letters roots. This affects the semantics as several words with different meanings might have the same root.

With light stemming, words are reduced to their stems. Light stemming removes frequently used prefixes and suffixes in Arabic words. Light stemming does not produce the root and therefore might fail to group all the semantically related words with a common syntactical form.

As a prelude to the new stemmer, it is necessary to discuss the previous stemmers. In this chapter, I will discuss the different stemming techniques. Because stemming is a language dependent technique and the focus of this study is Arabic stemming, only a few examples of stemming in languages other than Arabic are discussed.

Stemming in Other Languages

Stemming can be performed in five ways: affix removal, truncation, word segmentation, table look up, and n-grams.

Affix removal is the use of well-known morphological rules to extract roots by eliminating affixes (see previous chapter for examples).

Truncation is a simple method where words are cut at some arbitrary point to leave a character string no longer than some predetermined fixed length. Although it is very effective at reducing the size of the index files, it is too rigid and produces many useless search terms and results in low level of retrieval performance.

Word segmentation (also called letter successor variety) is a statistical approach that uses predetermined rules where the letter frequencies are used to segment the word into stems. This technique is best suited to dynamic texts.

Table look up is the simplest method assuming that all word variants and stems are entries in a table that includes necessary stemming information. This approach lacks practicality due to storage overhead.

N-grams are overlapping character sequences of different lengths ranging from 2-6 grams. This statistical approach does not produce stems. For example, for n=3, words that have three consecutive letters are grouped together.

The earliest two English language stemming algorithms are categorized as affix removal.

In addition to providing the benefit in minimizing storage requirements, a stemmer reduces the number of redundant terms while increasing the matching probability for document comparison, and unifies vocabulary.

Unfortunately, stemming can cause errors known as over-stemming and under-stemming, or false-positive and false-negatives respectively. Over-stemming occurs when two words with different stem are stemmed to the same root. Under-stemming occurs when two words that should be stemmed to the same root are not. The main problem is that reducing one type of error can lead to an increase of the other. Light-stemming reduces the over-stemming errors, but increases the under-stemming errors. On the other hand, heavy stemmers reduce the under-stemming errors while increasing the over-stemming errors.

Over and under stemming errors, reduce the stemming accuracy and can be used as criteria to evaluate the stemmer. Other criteria are algorithm speed, storage saving (compression), and retrieval effectiveness. In addition, stemming accuracy differs as the vocabulary used differs. Thus stemming is language dependent.

Stemming did not prove to be effective in English, but did prove to be effective for other languages such as French, Italian, and Spanish. Unfortunately, the same has not been effective with German because of that language's nature and complexity, especially the use of compound words. Later it has been discovered that n-grams achieved better results for languages with compound words such as Finnish, Dutch, and German.

Asian languages (e.g., Chinese and Japanese) use ideographs or symbols to represent words. Words have no explicit boundaries (Han characters) and multiple meanings. Word segmentation and n-grams proved to be the most effective stemming methodology for symbol-based languages.

Review of Previous Arabic Stemmers

Stemming Arabic documents was performed manually prior to TREC (Text Retrieval Conference) and was only applied on small corpora. Later, many researchers (both native and non-native Arabic speakers) created a considerable number of Arabic stemming algorithms.

In Arabic, the root is the original form of the word before any transformation process while a stem is a morpheme or a set of concatenated morphemes that can accept an affix. Based on the required level of analysis, Arabic stemmers are categorized as either root-based or stem-based.

Both Arabic root-based and stem-based algorithms suffer from generating stemming errors. Unfortunately, the unguided removal of a fixed set of prefixes and suffixes causes many stemming errors, especially where it is hard to distinguish between an extra letter and a root letter.

Although light stemmers produce fewer errors than aggressive root-based stemmers and were proven to outperform the root based stemmer in the field of IR, the aggressive stemmers reduce the size of the corpus significantly.

In conclusion, many issues hinder the current linguistic based stemmers and there is a need for a standarized stemming algorithm.

Stop Words

Stop words (or stopwords) or stop lists (or stoplists) are list of words that are filtered out prior to or after processing of text relying on their level of usefulness in a given context. The removal of stop words improve information retrieval and searching by ignoring words that usually appear in every document and thus are not helpful in distinguishing documents from each other. Removing stop words reduces the index size (number of distinct words in the index) and therefore saves space and time. Examples of some stop words in English include the, and, a, of, I, it, and you. Some search engines contain a single multilingual stop list, others contain a stop list for each language. Some tools avoid using stop lists in order to support phrase searching. In general stop lists are language specific. The main problem with stop words is that there is no standard list that can be applied to assure improving the retrieval process.

Larkey's Light10 Stemmer

Light stemming does not deal with patterns or infixes, it is simply the process of stripping off prefixes and/or suffixes. Unfortunately, the unguided removal of a fixed set of prefixes and suffixes causes many stemming errors, especially where it is hard to distinguish between an extra letter and a root letter. The algorithm stages are simplified below 1. Stop words removal.
2. Remove punctuation, diacritics, non letters and non Arabic.
3. Replace initial إ,أ,آ with ا.
4. Convert ى to ي and ة to ه
5. Remove the letter (و) from the beginning of the word only if the resulting word is more than three letters.
6. Remove definite articles ال,كال,بال,فال,وال from the beginning of the word only if the resulting words are two or more letters.
7. Remove the suffixes ها,ان,ات,ون,ين,يه,ية,ه,ة,ي from the end of the word (longer first) only if the resulting word is two letters or more.

The Larkey light stemmer ignored many suffixes, which can cause a high under-stemming error rate. Additionally, the Larkey list of suffixes and prefixes can be original letters Khoja's Root Based Stemmer Khoja's stemmer, presented by Khoja and Garside, is a superior root-based heavy stemmer. The Khoja algorithm initially removes suffixes, infixes and prefixes, and uses pattern matching to extract the roots. Below is a summarization of the Khoja stemming procedure.

1. Replace initial إ,أ,آ with ا.
2. Remove stop words.
3. Remove punctuation, non letters and diacritics.
4. Remove definite articles from the beginning of the word.
5. Remove the letter (و) from the beginning of the word and (ة) from the end of the word.
6. Remove prefixes and suffixes.
7. Compare the resulting word to patterns stored in the dictionary. If the resulting root is meaningless, the original word is returned without changes.

The algorithm suffered from problems, especially with broken plurals, proper names and nouns.

Stemming is a language-dependent approach and Arabic stemming is a very challenging process due to the language's complicated morphological structure. In this chapter, we defined the various stemming types and reviewed the research in English and Arabic language stemming.

Although many scholars attempted to create a modified version of the Khoja stemmer and the light stemmer, or even combined them with each other, the Khoja and the light10 remain the main Arabic stemmers in use. The focus by scholars on these two stemmers can be justified by many reasons:

Both Khoja and light10 stemmer has dominated the Arabic IR field.

The Khoja stemmer is available for free online and the light stemmer is easy to code.

Other stemmers are complicated, not clear and hard to code.

Some of the stemmers require statistical analysis.

A significant amount of research has been conducted based on both of these stemmers.

Some information retrieval software already incorporates these stemmers, e.g., the free multilingual toolkit (lemur).

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A computer-implemented method of stemming Arabic text comprising:
   removing stop words from a document comprising Arabic text based on at least one stop word entry in an array of stop words;
   flagging as nouns words determined to be attached to definite articles and preceded by a noun array entry in an array of stop words preceding at least one noun;
   adding flagged nouns to a noun dictionary;
   flagging as verbs words determined to be preceded by a verb array entry in an array of stop words preceding at least one verb;
   adding flagged verbs to a verb dictionary;
   searching the document for nouns and verbs based on the flagged nouns and the flagged verbs;
   removing remaining stop words subsequent to searching the document;
   applying light stemming on the flagged nouns only;
   Applying a root-based stemming on the flagged verbs only; and
   storing the stemmed document.

2. The method as claimed in claim 1, further comprising: prior to the first step of removing of stop words, categorizing the stop words into useful and useless stop words.

3. The method as claimed in claim 1, further comprising: generating the array of stop words using three methods: English stop words translation into Arabic, identification of common words in arbitrary Arabic documents, and manual search of synonyms to previously identified stop words.

4. A system for stemming Arabic text comprising: a processor; a memory, storing an input document comprising Arabic text, a stemming process, a noun stop word array of stop words preceding at least one noun, and a verb stop word array of stop words preceding at least one verb, and coupled with the processor, wherein the stemming process comprises a sequence of one or more instructions which, when executed by the processor, causes the processor to: remove stop words from the input document based on at least one noun stop word entry in the noun stop word array; flag as nouns words determined to be attached to definite articles and preceded by a noun stop word array entry; flag as verbs words determined to be preceded by a verb stop word array entry; search the document for nouns and verbs based on the flagged nouns and the flagged verbs; remove remaining stop words subsequent to searching the document to create a stemmed document; apply light stemming on the flagged nouns only; apply a root-based stemming on the flagged verbs only; and store the stemmed document to the memory.

5. The system as claimed in claim 4, further comprising instructions to cause the processor to categorize the stop words into useful and useless stop words prior to the first removing of stop words.

6. The system as claimed in claim 4, further comprising instructions to cause the processor to generate the array of stop words using three methods: English stop words translation into Arabic, identification of common words in arbitrary Arabic documents, and manual search of synonyms to previously identified stop words.

7. A non-transitory computer-readable medium storing instruction which, when executed by a processor, cause the processor to perform a method comprising:
   removing stop words from a document comprising Arabic text based on at least one stop word entry in an array of stop words;
   flagging as nouns words determined to be attached to definite articles and preceded by a noun array entry in an array of stop words preceding at least one noun;
   adding flagged nouns to a noun dictionary;
   flagging as verbs words determined to be preceded by a verb array entry in an array of stop words preceding at least one verb;
   adding flagged verbs to a verb dictionary;
   searching the document for nouns and verbs based on the flagged nouns and the flagged verbs;
   removing remaining stop words subsequent to searching the document;
   applying light stemming on the flagged nouns only;
   applying a root-based stemming on the flagged verbs only; and
   storing the stemmed document.

* * * * *